US011965437B2

(12) United States Patent
Matsuto et al.

(10) Patent No.: US 11,965,437 B2
(45) Date of Patent: Apr. 23, 2024

(54) ELECTRIC ACTUATOR

(71) Applicant: NTN Corporation, Osaka (JP)

(72) Inventors: Takushi Matsuto, Shizuoka (JP);
Shintarou Ishikawa, Shizuoka (JP);
Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 232 days.

(21) Appl. No.: 17/434,165

(22) PCT Filed: Feb. 26, 2020

(86) PCT No.: PCT/JP2020/007703
§ 371 (c)(1),
(2) Date: Aug. 26, 2021

(87) PCT Pub. No.: WO2020/179578
PCT Pub. Date: Sep. 10, 2020

(65) Prior Publication Data
US 2022/0145782 A1 May 12, 2022

(30) Foreign Application Priority Data

Mar. 5, 2019  (JP) ................................ 2019-039544
Mar. 14, 2019  (JP) ................................ 2019-047198
Mar. 18, 2019  (JP) ................................ 2019-049764

(51) Int. Cl.
F01L 1/344 (2006.01)
F01L 1/02 (2006.01)
(Continued)

(52) U.S. Cl.
CPC ............... F01L 1/344 (2013.01); F01L 1/022 (2013.01); F01L 1/053 (2013.01); F01L 1/352 (2013.01);
(Continued)

(58) Field of Classification Search
CPC ............... F01L 1/022; F01L 2001/0475; F01L 2001/0476; F01L 1/053; F01L 2001/0535;
(Continued)

(56) References Cited

U.S. PATENT DOCUMENTS

2014/0216372 A1  8/2014  Tadokoro et al.

FOREIGN PATENT DOCUMENTS

GB  2 175 656  12/1986
JP  5-306604  11/1993
(Continued)

OTHER PUBLICATIONS

Notice of Reasons for Refusal dated Dec. 13, 2022 in corresponding Japanese Patent Application No. 2019-049764, with English-language translation.

(Continued)

Primary Examiner — Loren C Edwards
(74) Attorney, Agent, or Firm — Wenderoth, Lind & Ponack, L.L.P.

(57) ABSTRACT

A differential includes a drive rotating body rotatable about a rotation axis, a planetary rotating body that is rotatable and is revolvable about the rotation axis, and a driven rotating body rotatable about the rotation axis. The planetary rotating body is made to mesh with each of the drive rotating body and the driven rotating body, so that a first speed reducer is constituted between the planetary rotating body and the drive rotating body and so that a second speed reducer is constituted between the planetary rotating body and the driven rotating body. The planetary rotating body is driven by an electric motor, and the drive rotating body is driven by a driving force from an engine. The intake camshaft is provided on the driven rotating body, and the exhaust camshaft is provided on the drive rotating body.

18 Claims, 22 Drawing Sheets

(51) Int. Cl.
| | |
|---|---|
| *F01L 1/053* | (2006.01) |
| *F01L 1/352* | (2006.01) |
| *F16H 35/00* | (2006.01) |
| *H02K 7/08* | (2006.01) |
| *H02K 7/116* | (2006.01) |
| *H02K 21/16* | (2006.01) |
| *F01L 1/047* | (2006.01) |
| *F16H 1/32* | (2006.01) |

(52) U.S. Cl.
CPC ........... *F16H 35/008* (2013.01); *H02K 7/083* (2013.01); *H02K 7/116* (2013.01); *H02K 21/16* (2013.01); *F01L 2001/0475* (2013.01); *F01L 2001/0476* (2013.01); *F01L 2001/0535* (2013.01); *F01L 2820/032* (2013.01); *F16H 1/32* (2013.01)

(58) Field of Classification Search
CPC ..... F01L 1/344; F01L 1/352; F01L 2820/032; H02K 7/083; H02K 7/116; H02K 21/16; F16H 35/008; F16H 1/32
See application file for complete search history.

(56) References Cited

FOREIGN PATENT DOCUMENTS

| | | | | |
|---|---|---|---|---|
| JP | H05306604 A | * | 11/1993 | ............... F01L 1/34 |
| JP | 2011-52625 | | 3/2011 | |
| JP | 2011052625 A | * | 3/2011 | ............... F01L 1/34 |
| JP | 2014-152673 | | 8/2014 | |
| JP | 2018-100744 | | 6/2018 | |
| JP | 2018-123727 | | 8/2018 | |
| JP | 2018-194151 | | 12/2018 | |
| WO | 2009/067789 | | 6/2009 | |

OTHER PUBLICATIONS

Extended European Search Report dated Jan. 11, 2023, in corresponding European Patent Application No. 20766720.5.
International Preliminary Report on Patentability and Written Opinion of the International Searching Authority dated Aug. 25, 2021 in International (PCT) Application No. PCT/JP2020/007703.
International Search Report dated Jun. 2, 2020 in International (PCT) Application No. PCT/JP2020/007703.

* cited by examiner

ELECTRIC ACTUATOR

TECHNICAL FIELD

The present invention relates to an electric actuator.

BACKGROUND ART

There is known an electric actuator that can change a rotation phase difference between an input side to which a driving force is input from outside and an output side that outputs the input driving force. Such an electric actuator is used, for example, for a variable valve timing device that changes opening and closing timings of one or both of an intake valve and an exhaust valve of an engine of an automobile.

In general, this type of electric actuator includes: an electric motor; and a speed reducer that obtains a driving force by the electric motor and transmits a rotational force while reducing the rotational force (See Patent Literatures 1 and 2). When the speed reducer is not driven by the electric motor, an input-side member (for example, a sprocket) and an output-side member (for example, a camshaft) rotate integrally. When the speed reducer is driven by the electric motor, the rotation phase difference of the output-side member with respect to the input-side member is changed by the speed reducer, whereby the opening and closing timings of the valve are adjusted.

CITATIONS LIST

Patent Literature

Patent Literature 1: JP2018-123727A
Patent Literature 2: JP2018-194151A

SUMMARY OF INVENTION

Technical Problems

However, in the electric actuator described in Patent Literature 1, output of only one system can only be obtained from input of two systems (the sprocket and the electric motor). Therefore, it is difficult to expand the application of the electric actuator.

As shown in FIG. 7, the valve opening and closing timings can be adjusted by the electric actuator in a double over head camshaft (DOHC) type engine in which an intake camshaft 101 having intake cams 101a and an exhaust camshaft 102 having exhaust cams 102a are provided separately and independently. That is, the opening and closing timings of the intake valve can be adjusted by driving the intake camshaft 101 with an electric actuator 103. In FIG. 7, the electric actuator is not coupled to the exhaust camshaft 102. However, if it is necessary to change the opening and closing timings of the exhaust valve, it is possible to satisfy such a request by coupling another electric actuator 103 to the exhaust camshaft 102.

However, in the case of a single over head camshaft (SOHC) type engine, an intake cam and an exhaust cam are provided on a common camshaft. Therefore, even if the electric actuator is coupled to the camshaft of the SOHC type engine, the phases of both the intake cam and the exhaust cam change simultaneously and in the same direction, so that the electric actuator cannot function as a variable valve timing device.

Therefore, an object of the present invention is to enable input of two systems and output of two systems and to thus expand the application of the electric actuator.

In the electric actuator disclosed in Patent Literature 2 above, a stator of an electric motor is fixed to an inner periphery of a casing. The stator needs to be accurately fixed at a predetermined position with respect to the casing in order to highly accurately set a motor gap formed between the stator and the rotor. For example, when the stator is fixed to the casing by adhesion, there is a possibility that the stator is displaced axially with respect to the casing when the adhesion strength is lowered due to long-term use or the like, and the reliability of fixing is therefore insufficient.

For example, it is also conceivable to axially position the stator with respect to the casing by using mechanical engagement means such as a snag ring. In this case, it is possible to reliably restrict axial movement of the stator with respect to the casing. However, since the snag ring is attached to an annular groove provided in the casing, the motor stator wobbles axially by the amount of a fitting gap between the snag ring and the annular groove, so that an axial positioning accuracy of the stator with respect to the casing cannot be made sufficiently high.

Therefore, it is necessary to improve reliability of fixing of the stator of the electric motor to the casing and the positioning accuracy in the axial direction.

For example, Patent Literature 2 discloses an electric actuator including a differential constituted by a cycloidal speed reducer. The electric actuator includes a drive rotating body (input rotating body) having a sprocket driven by an engine, a driven rotating body (output rotating body) driven by the drive rotating body, a planetary rotating body (inner gear) provided between the drive rotating body and the driven rotating body, and an electric motor having a rotor that drives the planetary rotating body. A cycloidal speed reducer is configured with: a first outer teeth portion formed on the drive rotating body; a first inner teeth portion and a second inner teeth portion formed on an inner peripheral surface of the planetary rotating body; and a second outer teeth portion formed on a driven rotating body.

The driven rotating body includes: a main body having the second outer teeth portion; a camshaft connected to the main body; and a center bolt connecting the main body and the camshaft. The center bolt connects the main body and the camshaft so that the main body and the camshaft rotate on the same axis.

In the electric actuator having the above configuration, when a driving force from the engine is transmitted to the sprocket of the drive rotating body, the camshaft of the driven rotating body rotates in synchronism with the sprocket. In this case, the speed reducers are not driven by the electric motor, the drive rotating body and the planetary rotating body rotate while maintaining mutual engagement, and the planetary rotating body and the driven rotating body rotate while maintaining mutual engagement.

After that, when the engine shifts to a low rotation range such as idle operation and the camshaft drives valves of the engine, the rotor of the electric motor is rotated relatively slower or faster than a rotation speed of the sprocket by electronic control or the like. In this case, the electric actuator changes the rotation phase difference of the driven rotating body with respect to the drive rotating body by causing the planetary rotating body of the cycloidal speed reducer to perform rotational motion and eccentric motion via the rotor, and adjusts the opening and closing timings of the valves.

In the electric actuator of Patent Literature 2 described above, when the rotor of the electric motor rotates to change the rotation phase difference of the driven rotating body with respect to the drive rotating body, a force for loosening the center bolt may act on the center bolt connecting the main body of the driven rotating body and the camshaft. If the center bolt has been loosened, power applied from the electric motor may not be accurately transmitted to the camshaft.

Therefore, it is necessary to reliably transmit power in the cycloidal speed reducer.

Solutions to Problems

As a technical means for achieving the above object, the present invention is an electric actuator including a differential that includes: a drive rotating body rotatable about a rotation axis; a planetary rotating body that is rotatable and is revolvable about the rotation axis; and a driven rotating body rotatable about the rotation axis. The planetary rotating body is engaged with each of the drive rotating body and the driven rotating body, a first speed reducer is constituted between the planetary rotating body and the drive rotating body, a second speed reducer is constituted between the planetary rotating body and the driven rotating body, and a reduction ratio of the first speed reducer and a reduction ratio of the second speed reducer is different from each other. The electric actuator further includes an electric motor that drives the planetary rotating body.

The drive rotating body is driven by a driving force from outside, the driven rotating body is provided with a first output member, and the drive rotating body is provided with a second output member.

In the electric actuator having such a configuration, input to the drive rotating body and the planetary rotating body and output from the drive rotating body and the driven rotating body are possible, which means that input of two systems and output of two systems are allowed. Therefore, the application of the electric actuator can be expanded as compared with a conventional electric actuator in which input of two systems and output of one system are common.

In a preferable configuration, any one the first output member and the second output member is an intake camshaft and the other is an exhaust camshaft. As a result, it is possible to independently drive the intake camshaft and the exhaust camshaft and to control a rotation phase of one camshaft independently of the rotation phase of the other camshaft.

It is preferable that one of the intake camshaft and the exhaust camshaft be made in a hollow shape and the other be disposed on an inner periphery of the one. With such a configuration, the exhaust camshaft and the intake camshaft constitute one shaft in appearance. Therefore, the electric actuator described above can be used as a variable valve timing device for an SOHC type engine.

It is preferable that the first output member be an intake camshaft, the second output member be an exhaust camshaft, the exhaust camshaft have a hollow shape, and an intake camshaft be disposed on an inner periphery of the exhaust camshaft.

In another technical means, the present invention is an electric actuator including: an intake camshaft; an exhaust camshaft; and an electric motor, wherein the intake camshaft or the exhaust camshaft is rotatable in an advance direction or a retard direction by a driving force of the electric motor, one of the intake camshaft and the exhaust camshaft is formed in a hollow shape, and another of the intake camshaft and the exhaust camshaft is disposed on an inner periphery of the one.

With such a configuration, the exhaust camshaft and the intake camshaft constitute one shaft in appearance. Therefore, the electric actuator can be used as a variable valve timing device for an SOHC type engine.

A driving source can be configured with an SOHC type engine.

An electric motor includes a casing, a stator fixed to an inner periphery of the casing, and a rotor rotatable about a rotation axis with respect to the casing. The casing includes: a first casing member; and a second casing member. An outer peripheral surface of the second casing member and an outer peripheral surface of the stator are fitted to an inner peripheral surface of the first casing member, and the first casing member and the second casing member sandwich and fix the stator from both axial sides.

As described above, by fitting the outer peripheral surface of the second casing member and the outer peripheral surface of the stator to the inner peripheral surface of the first casing member, the second casing member and the stator can be coaxially positioned with respect to the first casing member. In this state, the stator can be positioned in the axial direction with respect to the casing by sandwiching and fixing the stator from both axial sides by the first casing member and the second casing member. As described above, by sandwiching and fixing the stator from both axial sides by the first and second casing members, reliability of fixing can be improved as compared with adhesion or the like, and the stator and the casing can be fixed without wobbling in the axial direction.

When a motor shaft that rotates integrally with the rotor is provided, it is preferable to provide the following two bearings: a first bearing that rotatably supports one axial end part of the motor shaft with respect to the first casing member; and a second bearing that rotatably supports the other axial end part of the motor shaft with respect to the second casing member. As described above, the first casing member and the second casing member are disposed coaxially with the inner peripheral surface and the outer peripheral surface fitted to each other, and are mutually positioned in the axial direction by the axial abutment via the stator. In this way, since both axial ends of the motor shaft are supported by the first and second casing members positioned relative to each other in the radial direction and the axial direction via the first and second bearings, the rotation accuracy of the motor shaft is improved, and the motor performance is stabilized.

The above electric motor is incorporated in, for example, an electric actuator including: a drive rotating body that is rotatable about the rotation axis by a driving force from outside; a driven rotating body that is rotatable about the rotation axis; and a differential that is driven by the electric motor and thus causes the drive rotating body and the driven rotating body to relatively rotate. The above differential includes: a planetary rotating body that meshes with each of the drive rotating body and the driven rotating body, is rotatable along with rotation of the rotor, and can revolve around the rotation axis; a first speed reducer constituted between the planetary rotating body and the drive rotating body; and a second speed reducer constituted between the planetary rotating body and the driven rotating body, wherein a reduction ratio of the first speed reducer is different from a reduction ratio of the second speed reducer. In the case where the planetary rotating body revolves (eccentrically moves) about the rotation axis in this way, it is particularly preferable that the both axial ends of the motor shaft be supported by the casing via bearings to suppress whirling of the motor shaft as described above.

The above electric actuator can be used as a variable valve timing device in which the drive rotating body rotates integrally with a sprocket to which a rotational driving force from an engine is transmitted, and the driven rotating body rotates integrally with a camshaft.

As described above, by sandwiching and fixing the stator of the electric motor with the first and second casing members from both axial sides, reliability of fixing of the stator to the casing and positioning accuracy in the axial direction can be improved.

An electric actuator includes: a differential having a drive rotating body, a driven rotating body driven by the drive rotating body, and a cycloidal speed reducer disposed between the drive rotating body and the driven rotating body; and an electric motor that drives the differential. The driven rotating body in this case may include a main body, a shaft connected to the main body, and a positional displacement prevention member that prevents relative positional displacement between the main body and the shaft in the circumferential direction.

With this configuration, when the differential is driven by the electric motor, the positional displacement prevention member prevents the relative positional displacement between the main body and the shaft in the circumferential direction, so that the power from the cycloidal speed reducer of the differential mechanism can be reliably transmitted to the driven rotating body.

The above positional displacement prevention member may include a first hole formed in the main body, a second hole formed in an end face of the shaft, and a coupling pin inserted in the first hole and the second hole.

The positional displacement prevention member may include a key groove formed in one of the main body and the shaft, and a key formed in the other.

The main body is configured in a tubular shape into which the shaft can be inserted, and the positional displacement prevention member may include: a first plane formed on an inner peripheral surface of the main body; and a second plane that is formed on an outer peripheral surface of the shaft and is in contact with the first plane.

In the electric actuator described above, the electric motor may include an annular rotor, and the positional displacement prevention member may be disposed inside the rotor. With such a configuration, since the positional displacement prevention member is disposed to axially overlap the rotor, it is possible to prevent an increase of the axial dimension of the electric actuator.

The electric actuator includes a sprocket provided on the drive rotating body and a cam provided on the shaft, and can be used in a variable valve timing device that changes opening and closing timings of a valve by changing a rotation phase difference of the shaft with respect to the sprocket.

With the above configurations, power of the cycloidal speed reducer can be reliably transmitted.

Advantageous Effects of Invention

The present invention can provide an electric actuator capable of input of two systems and output of two systems. Therefore, the application of the electric actuator can be further expanded.

DESCRIPTION OF EMBODIMENT

Figure 1:
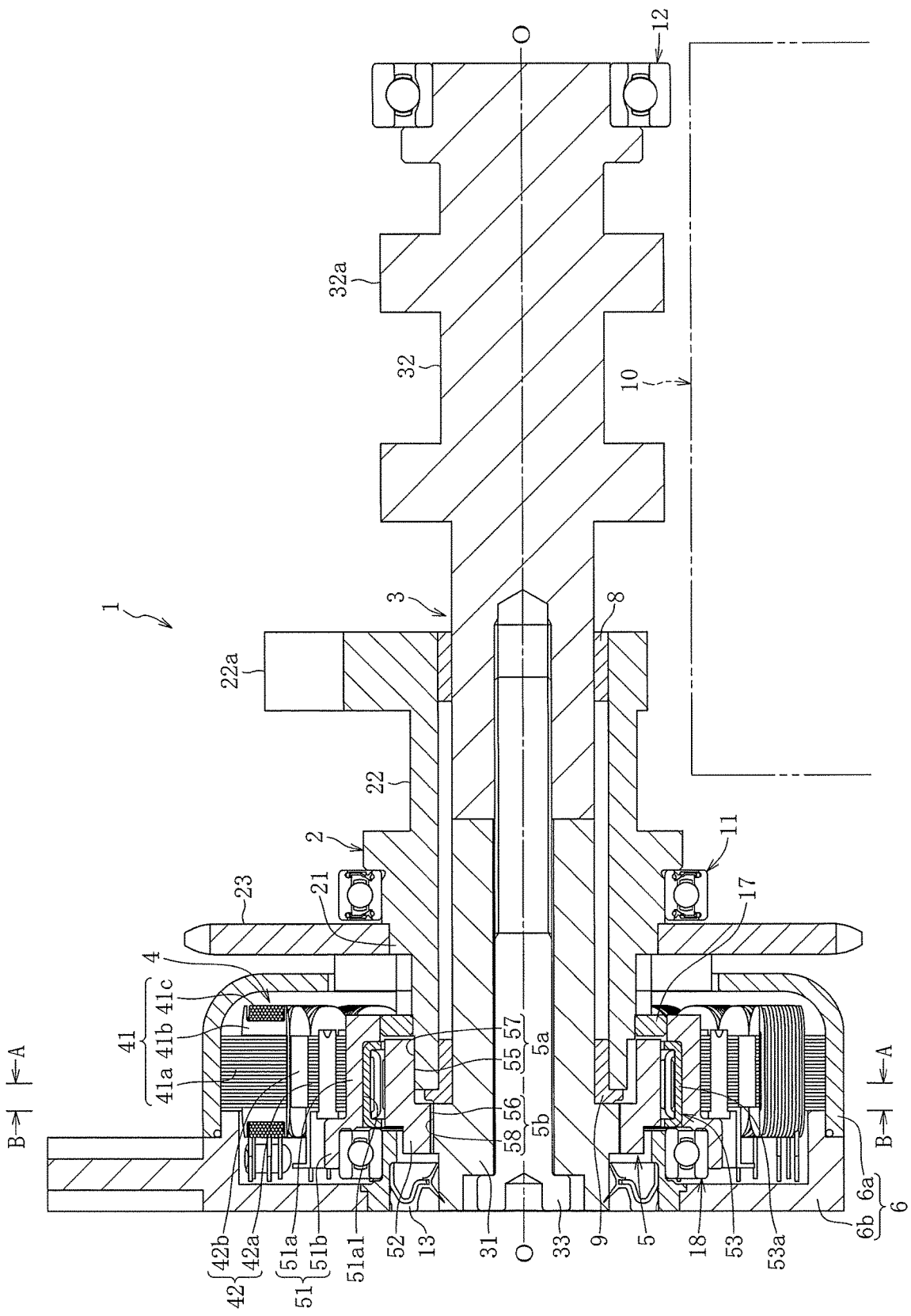
FIG. 1 is a vertical cross-sectional view of an electric actuator according to an embodiment of the present invention.

Hereinafter, the present invention will be described with reference to the accompanying drawings. In the drawings for describing the present invention, constituent elements such as members and component parts having the same function or shape are denoted by the same reference signs as long as they can be discriminated, and the description thereof will be omitted after once described.

Figure 2:
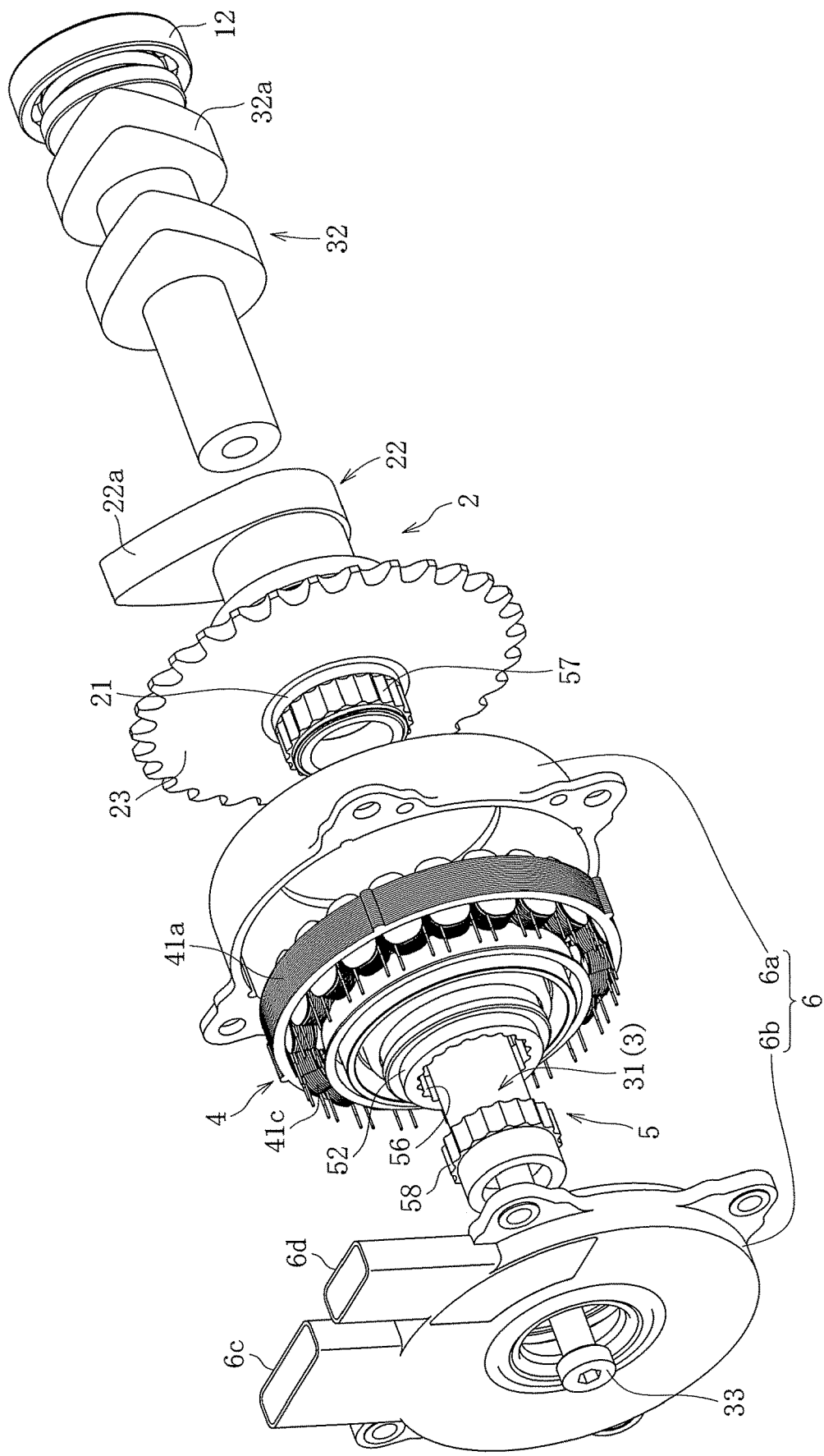
FIG. 2 is an exploded perspective view of the electric actuator according to the present embodiment.
Figure 3:
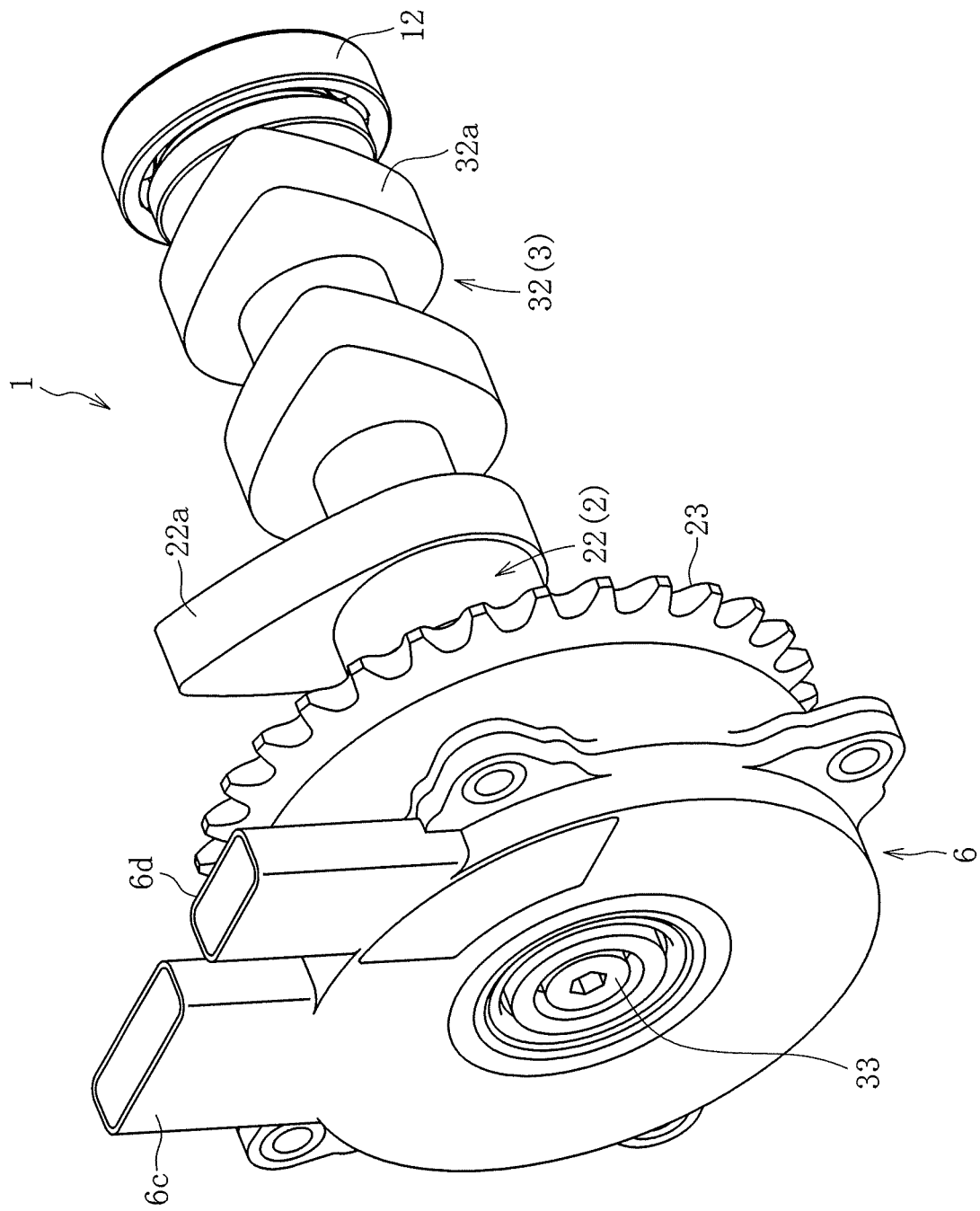
FIG. 3 is a perspective view of the electric actuator according to the present embodiment.

FIG. 1 is a vertical cross-sectional view of an electric actuator according to the present embodiment, FIG. 2 is an exploded perspective view of the electric actuator, and FIG. 3 is a perspective view of the electric actuator.

As shown in FIGS. 1 to 3, an electric actuator 1 according to the present embodiment is used as a variable valve timing device for an SOHC type engine (driving source). The electric actuator 1 includes, as main constituent elements: a drive rotating body 2; a driven rotating body 3; an electric motor 4; a differential 5; and a casing 6 that houses the drive rotating body 2, the driven rotating body 3, the electric motor 4, and the differential 5.

The drive rotating body 2 has, as a whole, a cylindrical shape with both axial ends opened, and includes: a main body 21 provided on the side opposite to the cylinder head 10 (left side in FIG. 1); an exhaust camshaft 22 as a second output member provided on the cylinder head 10 side (right side in FIG. 1); and a sprocket 23 serving as an input member of a driving force from the engine. One or a plurality of exhaust cams 22a are provided on the cylinder head 10 side of the exhaust camshaft 22. The sprocket 23 is attached to an outer peripheral surface of the main body 21 so as to be able to transmit torque, and is rotationally driven by a driving force from outside, for example, the driving force transmitted from the engine via a chain. The main body 21, the exhaust camshaft 22, and the sprocket 23 are all disposed coaxially on a rotation axis O. Therefore, the main body 21, the exhaust camshaft 22, and the sprocket 23 integrally rotate about the rotation axis O by the driving force from outside (the driving force from the engine). The exhaust camshaft 22 is rotatably supported on a head cover (not shown), which is a stationary member, via a bearing 11.

The present embodiment describes a case as an example. In the case, the main body 21 and the exhaust camshaft 22 are integrated into one body, but the sprocket 23 is configured with a separate member that is press-fitted and fixed to an outer periphery of the main body 21. The configuration is not limited to this example, and another configuration may be possible in which any two portions of the main body 21, the exhaust camshaft 22, and the sprocket 23 can be integrated into one body and the remaining portion can be configured with a separate member. Alternatively, the main body 21, the exhaust camshaft 22, and the sprocket 23 may be all integrally formed, or may be all formed of separate members.

The driven rotating body 3 is a member that outputs the driving force transmitted from the drive rotating body 2, and includes a cylindrical main body 31 provided on the side opposite to the cylinder head 10 and an intake camshaft 32 as a first output member provided on the cylinder head 10 side. The intake camshaft 32 is provided with one or a plurality of intake cams 32a. The main body 31 and the intake camshaft 32 are coaxially disposed on the rotation axis O and are coupled to each other with a center bolt 33. Therefore, the main body 31 and the intake camshaft 22 integrally rotate about the rotation axis O. An end part, of the intake camshaft 32, on the cylinder head 10 side is rotatably supported via a bearing 12 with respect to the head cover.

The intake camshaft 32 is disposed on an inner periphery of the exhaust camshaft 22 having a hollow shape with both ends opened. The shaft end, of the intake camshaft 32, on the cylinder head 10 side protrudes axially from the shaft end, of the exhaust camshaft 22, on the cylinder head 10 side. A bearing 8 is disposed between the inner periphery of the exhaust camshaft 22 and an outer periphery of the intake camshaft 32, and a bearing 9 is disposed between an inner periphery of the main body 21 of the drive rotating body 2 and the outer periphery of the main body 31 of the driven rotating body 3. These bearings 8 and 9 allow relative rotation between the drive rotating body 2 and the driven rotating body 3. The bearings 8 and 9 can be configured with, for example, plain bearings.

For convenience of assembly, the casing 6 is divided into a bottomed cylindrical casing main body 6a and a lid portion 6b. The casing main body 6a and the lid portion 6b are integrated into one body by using fastening means such as bolts. The lid portion 6b is provided with tubular protrusions 6c and 6d (see FIG. 2) for leading out a power supply line for supplying power to the electric motor 4 and a signal line connected to a rotation speed detection sensor (not shown) for detecting a rotation speed of the electric motor 4. A space between the inner peripheral surface of the lid portion 6b of the casing 6 and an outer peripheral surface of the main body 31 of the driven rotating body 3 is sealed with an oil seal 13.

The electric motor 4 is a radial gap type motor having: a stator 41 fixed to the casing main body 6a; and a rotor 42 arranged on the radially inner side of the stator with a gap so as to face the stator 41. The stator 41 is configured with: a stator core 41a including a plurality of magnetic steel sheets laminated axially; bobbins 41b each mounted on the stator core 41a and made of an insulating material; and stator coils 41c wound around the bobbins 41b. The rotor 42 is configured with an annular rotor core (rotor inner) 42a and a plurality of magnets 42b attached to the rotor core 42a. An excitation force acting between the stator 41 and the rotor 42 rotates the rotor 42 about the rotation axis O.

The differential 5 includes, as main constituent elements: the main body 21 of the drive rotating body 2; the main body 31 of the driven rotating body 3; the eccentric member 51 that rotates integrally with the rotor 42; the planetary rotating body 52 disposed on an inner periphery of the eccentric member 51; and a bearing 53 disposed between the eccentric member 51 and the planetary rotating body 52.

The eccentric member 51 integrally includes: a small-diameter tubular portion 51a fixed to an inner periphery of the rotor core 42a; and a large-diameter tubular portion 51b formed to have a larger diameter than the small-diameter tubular portion 51a and protruding axially from the rotor core 42a. An outer peripheral surface of the eccentric member 51 is a cylindrical surface formed coaxially with the rotation axis O. On an inner peripheral surface of the small-diameter tubular portion 51a of the eccentric member 51, there is formed a cylindrical surface-shaped eccentric inner peripheral surface 51a1 that is eccentric with respect to the rotation axis O. A region of the inner peripheral surface of the eccentric member 51 other than the eccentric inner peripheral surface 51a1 is a cylindrical surface formed coaxially with the rotation axis O. The eccentric member 51 has a thick part and a thin part when viewed on a radial cross-section passing through the eccentric inner peripheral surface 51a1 (see FIGS. 4 and 5).

The eccentric member 51 is supported by bearings 17 and 18 disposed on both axial sides. In the present embodiment, the bearing 17 on the cylinder head 10 side is configured with a plain bearing, and the bearing 18 on the side opposite to the cylinder head 10 is configured with a rolling bearing (deep groove ball bearing). However, the configurations and the types of both the bearings 17 and 18 can be arbitrarily chosen, and for example, the bearing 7 on the cylinder head 10 side can be configured also with a rolling bearing. The eccentric member 51 is rotatably supported on the drive rotating body 2 via the bearing 17 on the cylinder head 10 side, and the eccentric member 51 is rotatably supported on the lid portion 6b of the casing 6 via the bearing 18 on the side opposite to the cylinder head 10.

The planetary rotating body 52 has a cylindrical shape, and a first inner teeth portion 55 and a second inner teeth portion 56 are formed on the inner periphery of the planetary rotating body. Each of the first inner teeth portion 55 and the second inner teeth portion 56 is configured with a plurality of teeth whose radial cross-section is a curve (for example, a trochoidal curve). The first inner teeth portion 55 and the second inner teeth portion 56 are formed to be shifted axially, and the first inner teeth portion 55 is provided on the cylinder head 10 side, and the second inner teeth portion 56 is provided on the side opposite to the cylinder head 10. A pitch circle diameter of the second inner teeth portion 56 is smaller than a pitch circle diameter of the first inner teeth portion 55. The number of teeth of the second inner teeth portion 56 is smaller than the number of teeth of the first inner teeth portion 55.

A first outer teeth portion 57 meshing with the first inner teeth portion 55 is formed on the outer peripheral surface of the main body 21 of the drive rotating body 2. A second outer teeth portion 58 meshing with the second inner teeth portion 56 is formed on the outer peripheral surface of the main body 31 of the driven rotating body 3. Each of the first outer teeth portion 57 and the second outer teeth portion 58 is configured with a plurality of teeth whose radial cross-section is a curve (for example, a trochoidal curve). A pitch circle diameter of the second outer teeth portion 58 is smaller than a pitch circle diameter of the first outer teeth portion 57, and the number of teeth of the second outer teeth portion 58 is smaller than the number of teeth of the first outer teeth portion 57.

The number of teeth of the first outer teeth portion 57 is smaller than the number of teeth of the first inner teeth portion 55 meshing with the first outer teeth portion 57, and is preferably smaller by one. Similarly, the number of teeth of the second outer teeth portion 58 is also smaller than the number of teeth of the second inner teeth portion 56 meshing with the second outer teeth portion 58, and is preferably smaller by one. As an example, in the present embodiment, the number of teeth of the first inner teeth portion 55 is 24, the number of teeth of the second inner teeth portion 56 is 20, the number of teeth of the first outer teeth portion 57 is 23, and the number of teeth of the second outer teeth portion 58 is 19.

The first inner teeth portion 55 and the first outer teeth portion 57 that mesh with each other constitute a first speed reducer 5a, and the second inner teeth portion 56 and the second outer teeth portion 58 constitute a second speed reducer 5b. The first speed reducer 5a and the second speed reducer 5b are each so-called a hypocycloid speed reducer. The reduction ratios of the two speed reducers 5a and 5b are different, and in the present embodiment, the reduction ratio of the first speed reducer 5a is made larger than the reduction ratio of the second speed reducer 5b. By making the reduction ratios of the two speed reducers 5a and 5b different in this manner, it is possible to change (differentiate) the rotation of the intake camshaft 32 driven by the engine depending on an operation state of the electric motor 4 as will be described later.

The bearing 53 is configured with, for example, a needle roller bearing having an outer race 53a. The bearing 53 is disposed between the eccentric inner peripheral surface 51a1 of the eccentric member 51 and a cylindrical surface-shaped outer peripheral surface of the planetary rotating body 52. Therefore, a center P (see FIGS. 4 and 5) of an outer peripheral surface and an inner peripheral surface of the planetary rotating body 52 is at a position eccentric to the rotation axis O. The bearing 53 supports the planetary rotating body 52 to be relatively rotatable with respect to the eccentric member 51.

Figure 4:
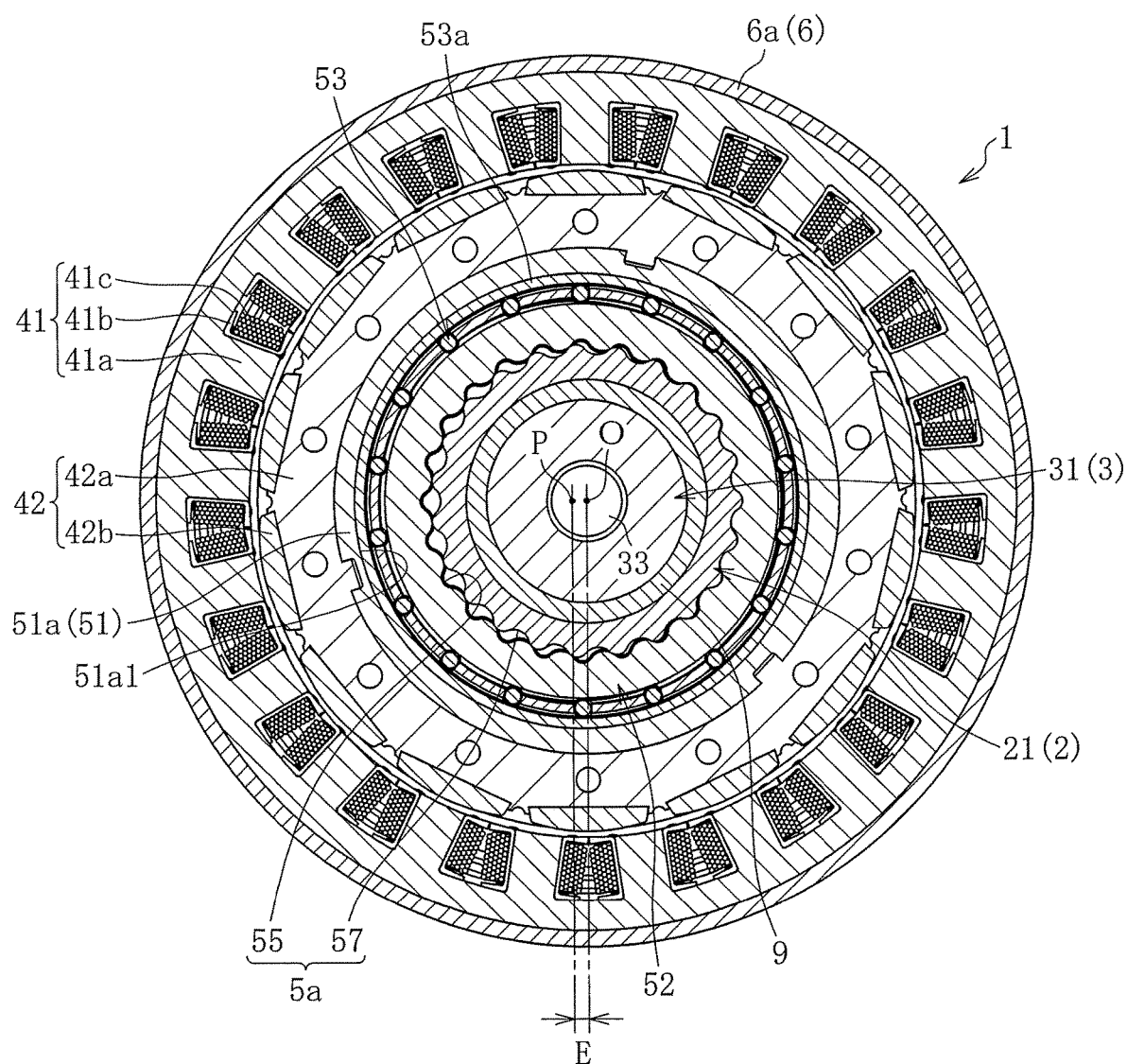
FIG. 4 is a cross-sectional view taken along line A-A in FIG. 1.
Figure 5:
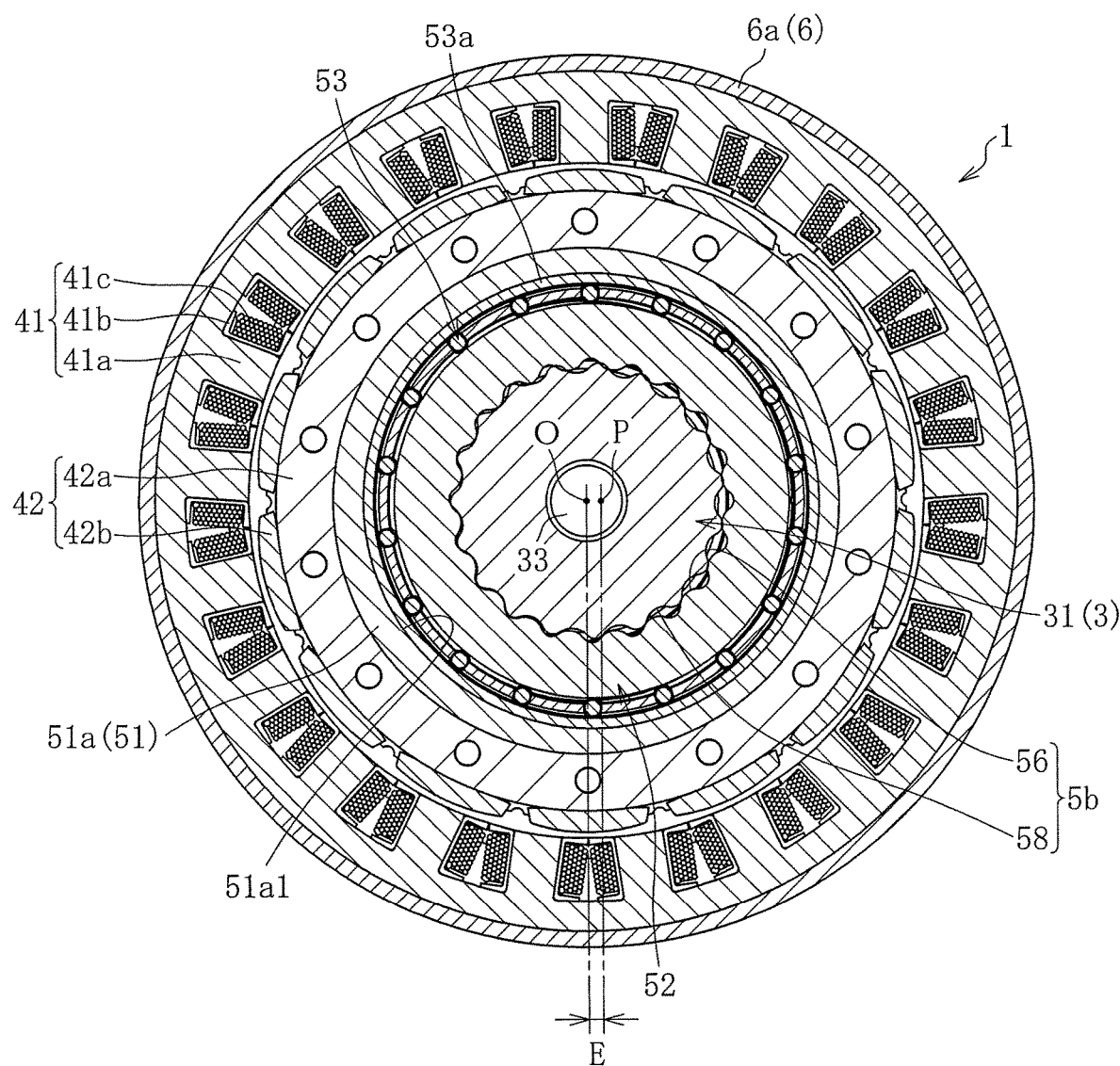
FIG. 5 is a cross-sectional view taken along line B-B in FIG. 1.

FIG. 4 is a cross-sectional view taken across the first speed reducer 5a (a cross-sectional view taken along line A-A in FIG. 1), and FIG. 5 is a cross-sectional view taken across the second speed reducer 5b (a cross-sectional view taken along line B-B in FIG. 1).

As shown in FIG. 4, the center P of the first inner teeth portion 55 is eccentric by a distance E in the radial direction with respect to the rotation axis O. Therefore, the first inner teeth portion 55 and the first outer teeth portion 57 mesh with each other in a partial region in the circumferential direction, and do not mesh with each other in a region on the side opposite to this partial region in the radial direction. Further, as shown in FIG. 5, since the center P of the second inner teeth portion 56 is also eccentric by a distance E in the radial direction with respect to the rotation axis O, the second inner teeth portion 56 and the second outer teeth portion 58 mesh with each other in a partial region in the circumferential direction, and do not mesh with each other in a region on the side opposite to this partial region in the radial direction. Because the view directions are different between FIGS. 4 and 5, the drawings show that the first inner teeth portion 55 and the second inner teeth portion 56 are eccentric to each other in laterally opposite directions, but the first inner teeth portion 55 and the second inner teeth portion 56 are eccentric in the same direction by the same distance E.

Here, when a reduction ratio of the differential 5 is i, a motor rotation speed is nm, and a rotation speed of the sprocket 23 is nS, an output rotation phase angle difference is represented by the formula $(nm-nS)/i$.

In addition, when the number of teeth of the first inner teeth portion 55 is z1 and the number of teeth of the second inner teeth portion 56 is z2, the reduction ratio of the differential 5 according to the present embodiment is obtained by following Equation 1.

$$\text{Reduction ratio} = z1 \times z2 / |z1 - z2| \qquad \text{Equation 1}$$

For example, when the number of teeth z1 of the first inner teeth portion 55 is 24 and the number of teeth z2 of the second inner teeth portion 56 is 20, the reduction ratio is 120 according to above Equation 1. As described above, with the differential 5 according to the present embodiment, high torque can be obtained with a large reduction ratio.

In the electric actuator 1 of the present embodiment, since the drive rotating body 2 and the driven rotating body 3 are disposed on the inner diameter side of the planetary rotating body 52, it is possible to adopt a layout in which a hollow motor is adopted as the electric motor 4 that drives the planetary rotating body 52, and the hollow motor can be disposed on the outer diameter side of the planetary rotating body 52. As a result, space efficiency is improved, and there is an advantage that the electric actuator can be made compact (in particular, the axial dimension can be made compact).

Next, an operation of the electric actuator according to the present embodiment will be described with reference to FIGS. 1 to 5.

During the operation of the engine, the drive rotating body 2 rotates by the driving force transmitted from the engine to the sprocket 23, and the exhaust camshaft 22 accordingly rotates. At this time, the rotation speed of the exhaust camshaft 22 is equal to the rotation speed of the sprocket 23.

In a state where the electric motor 4 is not energized and there is therefor no input from the electric motor 4 to the differential 5, the rotation of the drive rotating body 2 is transmitted to the driven rotating body 3 via the planetary rotating body 52, and the driven rotating body 3 rotates integrally with the drive rotating body 2. That is, the drive rotating body 2 and the planetary rotating body 52 integrally rotate while maintaining a meshing state, by the torque transmitted at the meshing part between the first inner teeth portion 55 and the first outer teeth portion 57. Similarly, the planetary rotating body 52 and the driven rotating body 3 also integrally rotate while maintaining a meshing position between the second inner teeth portion 56 and the second outer teeth portion 58. Therefore, the drive rotating body 2 and the driven rotating body 3 rotate while maintaining the same rotation phase. As a result, the exhaust camshaft 22 and the intake camshaft 32 rotate with a rotation phase difference of 0.

Thereafter, for example, when the engine shifts to a low rotation range such as an idle operation, the electric motor 4 is energized by a known means such as electronic control so as to rotate the rotor 42 relatively slower or faster than the rotation speed of the sprocket 23. When the electric motor 4 is operated, the eccentric member 51 coupled to the rotor core 42b of the rotor 42 rotates integrally about the rotation axis O. Accordingly, a pressing force caused by the rotation of the eccentric member 51 having the thin part and the thick part acts on the planetary rotating body 52 via the bearing 53. This pressing force generates a component force in the circumferential direction at the meshing part between the first inner teeth portion 55 and the first outer teeth portion 57, so that the planetary rotating body 52 relatively performs eccentric rotational movement with respect to the drive rotating body 2. That is, the planetary rotating body 52 revolves about the rotation axis O and rotates about the center P of the first inner teeth portion 55 and the second inner teeth portion 56. At this time, the meshing position between the first inner teeth portion 55 and the first outer teeth portion 57 is shifted in the circumferential direction by one tooth every time the planetary rotating body 51 revolves once; therefore, the planetary rotating body 52 rotates (spins) while being decelerated.

When the planetary rotating body 52 performs the eccentric rotational movement described above, the meshing point between the second inner teeth portion 56 and the second outer teeth portion 58 is shifted in the circumferential direction by one tooth for each revolution of the planetary rotating body 52. As a result, the driven rotating body 3 rotates while being decelerated with respect to the planetary rotating body 52. As described above, when the planetary rotating body 52 is driven by the electric motor 4, the driving force from the electric motor 4 is superposed on the driving force from the sprocket 23, and the rotation of the driven rotating body 3 is in a differential state where the driven rotating body 3 is affected by the driving force from the electric motor 4. Therefore, the relative rotation phase difference of the driven rotating body 3 with respect to the drive rotating body 2 can be changed in the forward or reverse direction, and the opening and closing timings of the intake valves (not illustrated) by the intake cams 32a can be changed in the advance direction or the retard direction.

Since the opening and closing timings of the intake valves are changed in this manner, it is possible to stabilize the rotation of the engine and improve the fuel efficiency during the idle operation. Further, when the operation of the engine shifts from the idle state to a normal operation and shifts, for example, to high speed rotation, the rotation phase difference of the intake camshaft 32 with respect to the sprocket 23 can be changed to the rotation phase difference suitable for the high speed rotation by increasing the speed difference of the relative rotation of the electric motor 4 with respect to the sprocket 23, so that the output of the engine can be increased.

As described above, in the electric actuator of the present embodiment, input to the drive rotating body 2 and the planetary rotating body 52 (the former is the input of the driving force of the engine, and the latter is the input of the driving force of the electric motor 4) and output from the drive rotating body 2 and the driven rotating body 3 (the former is an output to the exhaust camshaft 22, and the latter is an output to the intake camshaft 32) are possible, which means that input of two systems and output of two systems are allowed. Therefore, application of the electric actuator 1 can be expanded as compared with a conventional electric actuator in which input of two systems and output of one system are common. Specifically, as described below, the present invention can be used as a variable valve timing device for an SOHC type engine.

Figure 6:
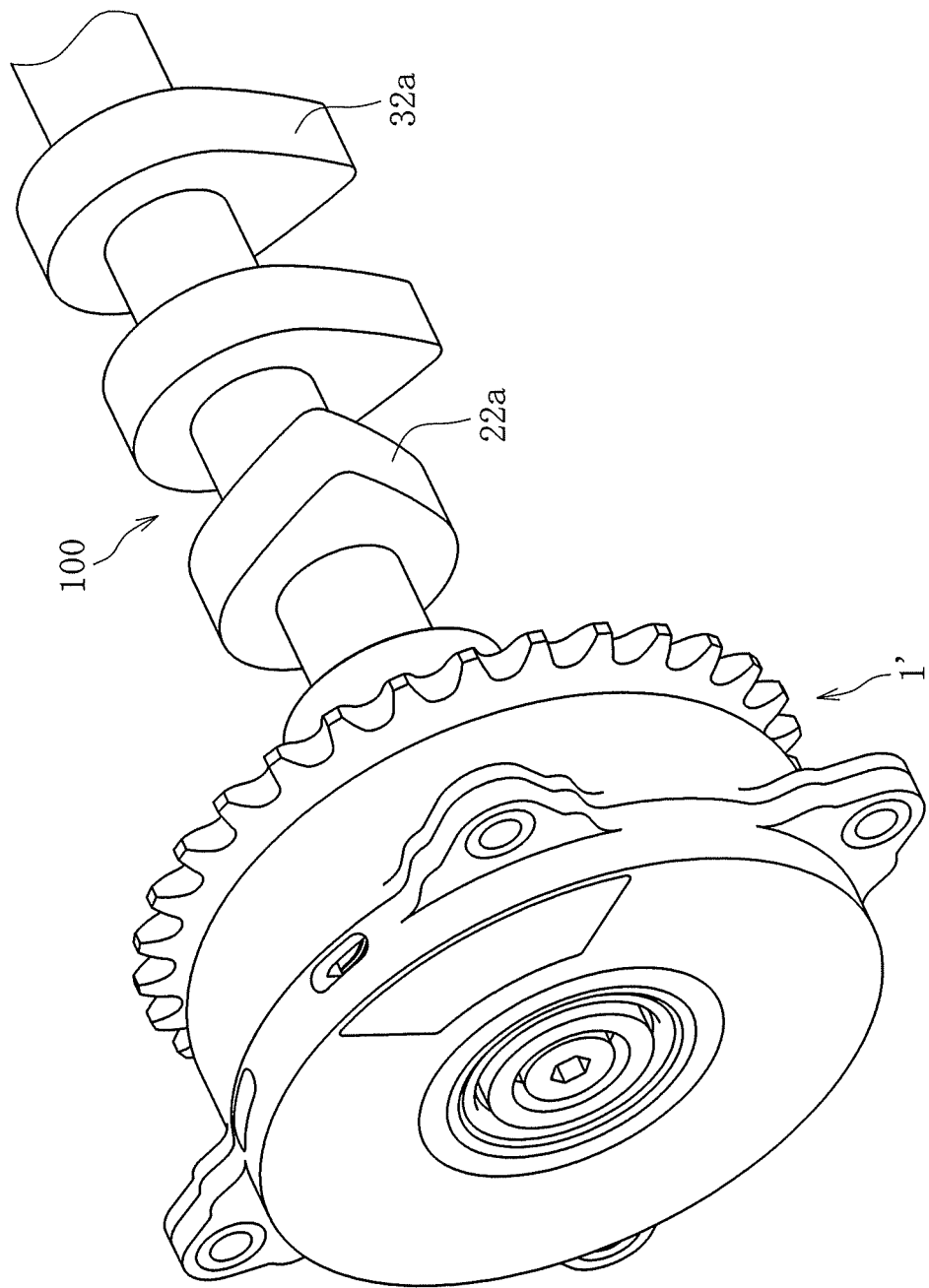
FIG. 6 is a perspective view illustrating a camshaft of an SOHC type engine.
Figure 7:
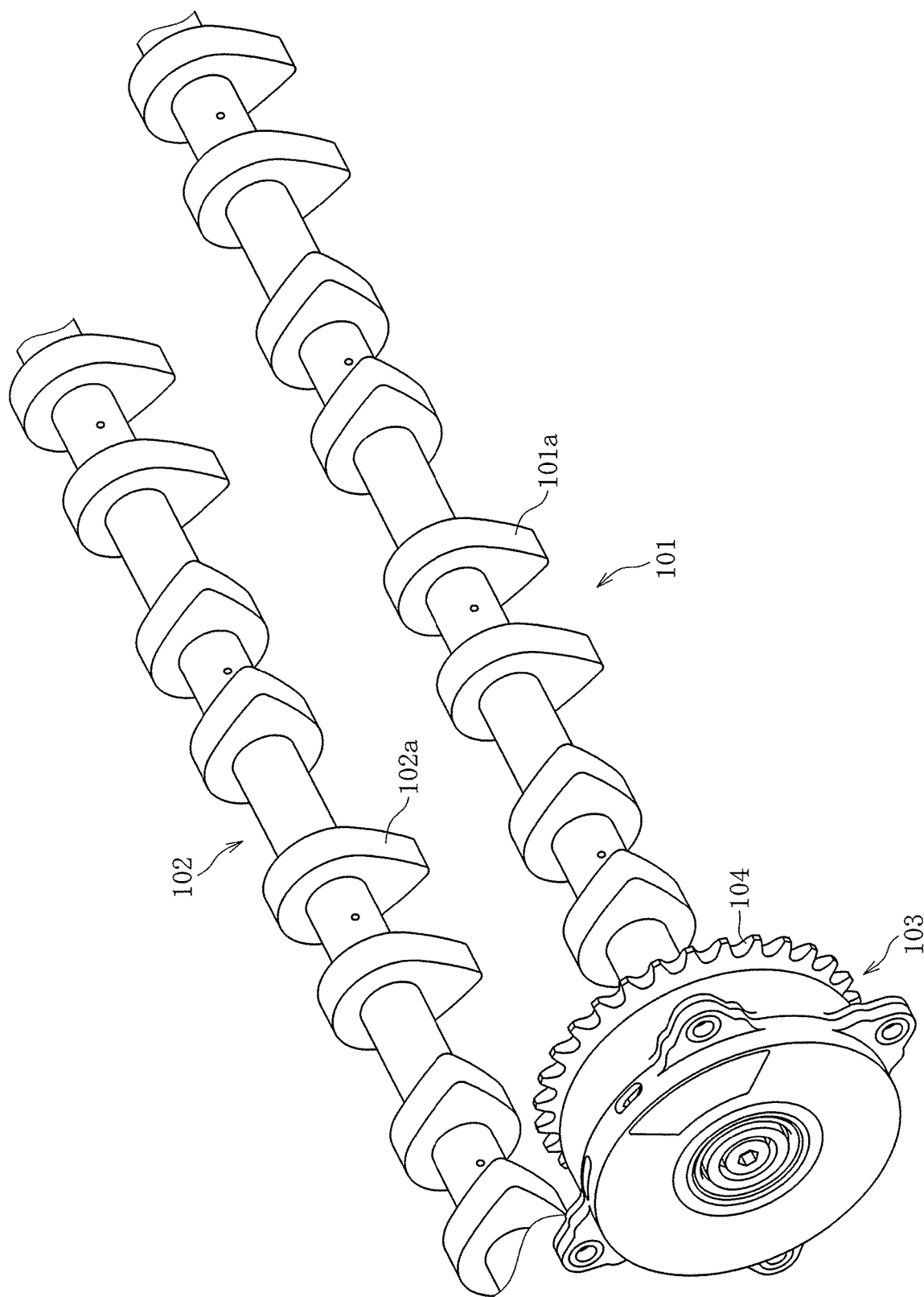
FIG. 7 is a perspective view illustrating camshafts of a DOHC type engine.

As shown in FIG. 6, in the SOHC type engine, exhaust cams 22a and intake cams 32a are attached to a common camshaft 100. Therefore, even if a common electric actuator 1' is coupled to the camshaft 100, the opening and closing timings of the exhaust valves and the opening and closing timings of the intake valves change in the same direction at the same time; therefore, the camshaft cannot function as a variable valve timing device.

In contrast, since the electric actuator 1 according to the present embodiment enables output of two systems, the intake camshaft 32 and the exhaust camshaft 22 are independently driven, and the rotation phase of the intake camshaft 32 can be controlled regardless of the rotation phase of the exhaust camshaft. In addition, since the exhaust camshaft 22 has a hollow shape and the intake camshaft 32 is disposed on the inner periphery of the exhaust camshaft 22, the exhaust camshaft 22 and the intake camshaft 32 constitute a single shaft in appearance. Therefore, the electric actuator 1 can be used as a variable valve timing device for an SOHC type engine.

The above description has exemplified the case where the hypocycloid speed reducers are used as the first speed reducer 5a and the second speed reducer 5b. However, it is possible to use, for the differential 5, speed reducers each having an arbitrary configuration (cycloidal speed reducer, harmonical drive gearing device, planetary gear device, and the like) as long as the speed reducers each have a planetary rotating body 52 that rotates and revolves and as long as the reduction ratios of the two speed reducers 5a and 5b are different. It is also possible to use a speed reducer of a type in which a roller assembly retaining a plurality of rollers by a cage is used instead of the planetary rotating body 52 and in which the rollers are rolled along the first outer teeth portion 57 and the second outer teeth portion 58.

The above description has exemplified the case where the exhaust camshaft 22 has a hollow shape and the intake camshaft 32 is disposed on the inner periphery of the exhaust camshaft 22. However, to the contrary, the intake camshaft 32 may have a hollow shape, and the exhaust camshaft 22 may be disposed on the inner periphery of the intake camshaft 32.

In addition, the above description has exemplified the case where the exhaust camshaft 22 is provided on the drive rotating body 2 and the intake camshaft is provided on the driven rotating body 3. However, to the contrary, the intake camshaft 32 may be provided on the drive rotating body 2 and the exhaust camshaft 22 may be provided on the driven rotating body 3.

Hereinafter, another example of the electric actuator will be described with reference to the accompanying drawings. In the drawings, constituent elements such as members and component parts having the same function or shape are denoted by the same reference signs as long as they can be discriminated, and the description thereof will be omitted after once described.

Figure 8:
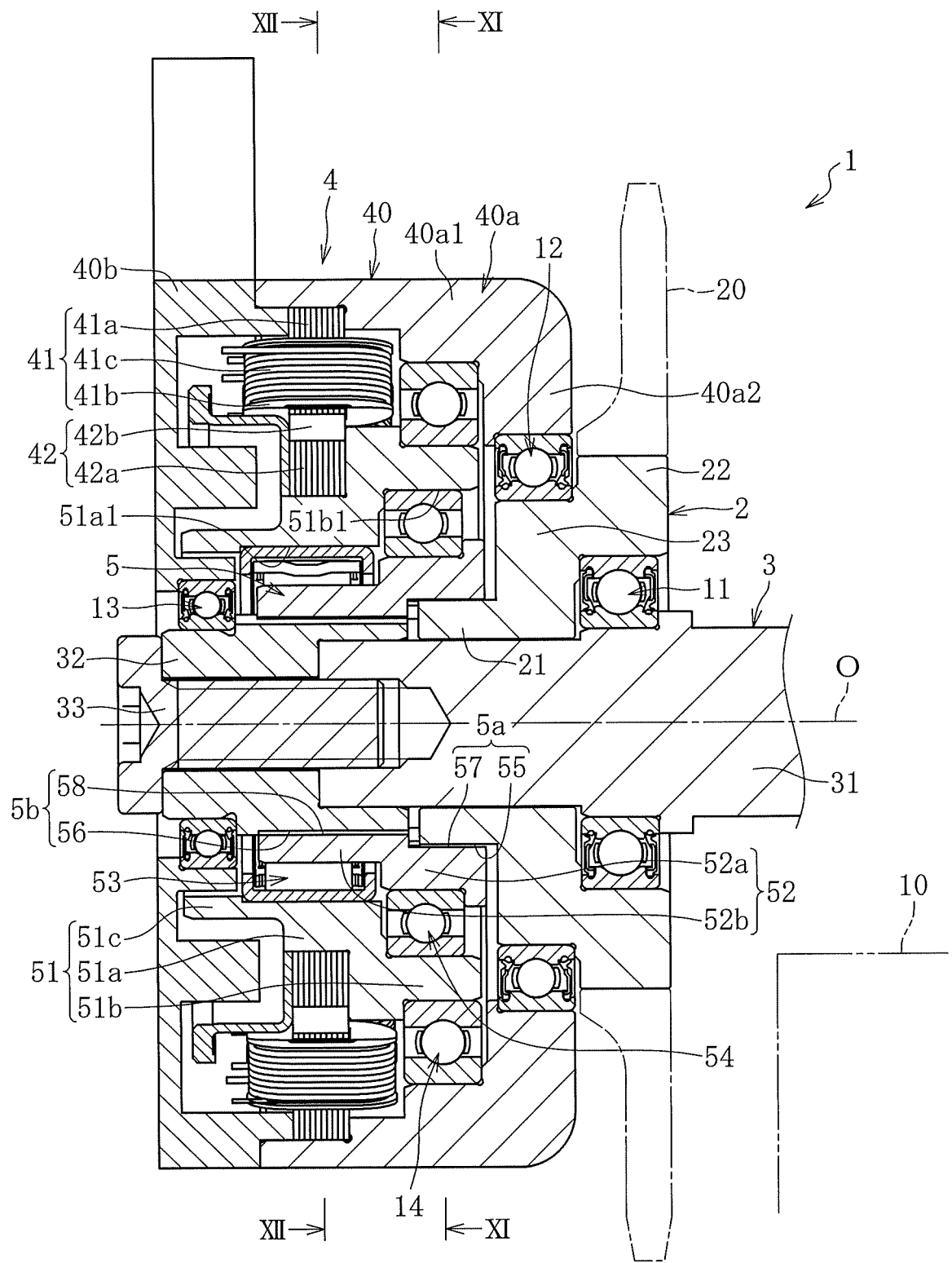
FIG. 8 is a cross-sectional view of the electric actuator (cross-sectional view taken along line VIII-VIII in FIG. 9).

An electric actuator 1 shown in FIG. 8 is used as, for example, a variable valve timing device provided on a cylinder head 10 (depicted by a chain line in FIG. 8) of an engine. The electric actuator 1 includes, as main constituent elements: a drive rotating body 2; a driven rotating body 3 that rotates integrally with a camshaft (not illustrated) provided on the cylinder head 10; an electric motor 4; and a differential 5.

The drive rotating body 2 has, as a whole, a cylindrical shape with both axial ends opened, and includes: a small diameter portion 21 provided at an end part, of the drive rotating body 2, on the side opposite to the cylinder head 10 (left side in FIG. 8); a large diameter portion 22 that is provided on the cylinder head 10 side (right side in FIG. 8) of the small diameter portion 21 and has an inner diameter and an outer diameter both larger than the small diameter portion 21; and a connecting portion 23 connecting the small diameter portion 21 and the large diameter portion 22. A sprocket 20 is fixed to an outer periphery of the large diameter portion 22. The sprocket 20 is attached to an outer peripheral surface of the large diameter portion 22 so as to be able to transmit torque, and the sprocket 20 is rotationally driven by a driving force transmitted from the engine via a chain. The drive rotating body 2 and the sprocket 20 are coaxially disposed about a rotation axis O, and integrally rotate about the rotation axis O by the driving force from the engine. The present embodiment exemplifies the case where the sprocket 20 is configured with a separate member that is press-fitted and fixed to the outer periphery of the large diameter portion 22. However, the present invention is not limited to this example, and the large diameter portion 22 and the sprocket 20 may be integrally formed.

The driven rotating body 3 is a member that outputs the driving force transmitted from the drive rotating body 2, and includes: an output shaft 31; and a driven gear 32 provided on the side, of the output shaft 31, opposite to the cylinder head 10 (left side in FIG. 8). The output shaft 31 and the driven gear 32 are coaxially disposed on the rotation axis O and are coupled to each other with a center bolt 33. Therefore, the output shaft 31 and the driven gear 32 integrally rotate about the rotation axis O. The output shaft 31 is connected to the camshaft to be able to transmit torque. Note that the output shaft 31 and the driven gear 32, or the output shaft 31 and the camshaft, or all of them may be integrally formed.

An inner peripheral surface of the small diameter portion 21 of the drive rotating body 2 and the outer peripheral surface of the output shaft 31 are slidably fitted. Further, a bearing 11 is provided between an inner peripheral surface of the large diameter portion 22 of the drive rotating body 2 and the outer peripheral surface of the output shaft 31. As the bearing 11, for example, a rolling bearing, specifically, a ball bearing can be used, and a deep groove ball bearing is used in the illustrated example. An outer race of the bearing 11 is fixed to an inner peripheral surface of the drive rotating body 2, and an inner race of the bearing 11 is fixed to the outer peripheral surface of the output shaft 31. This arrangement allows relative rotation between the drive rotating body 2 and the driven rotating body 3. However, a bearing (for example, a plain bearing) may also be provided between the inner peripheral surface of the small diameter portion 21 of the drive rotating body 2 and the outer peripheral surface of the output shaft 31.

The electric motor 4 is a radial gap type motor having: a casing 40; a stator 41 fixed to an inner periphery of the casing 40; and a rotor 42 arranged on the radially inner side of the stator with a gap so as to face the stator 41. In the illustrated example, not only the stator 41 and the rotor 42 but also a differential 5 to be described later are housed in the inner periphery of the casing 40.

The stator 41 has: a stator core 41a including a plurality of magnetic steel sheets laminated axially, bobbins 41b each mounted on the stator core 41a and made of an insulating material, and a stator coils 41c wound around the bobbins 41b. The rotor 42 has an annular rotor core (rotor inner) 42a and a plurality of magnets 42b attached to an outer periphery of the rotor core 42a. An excitation force acting between the stator 41 and the rotor 42 rotates the rotor 42 about the rotation axis O.

Figure 9:
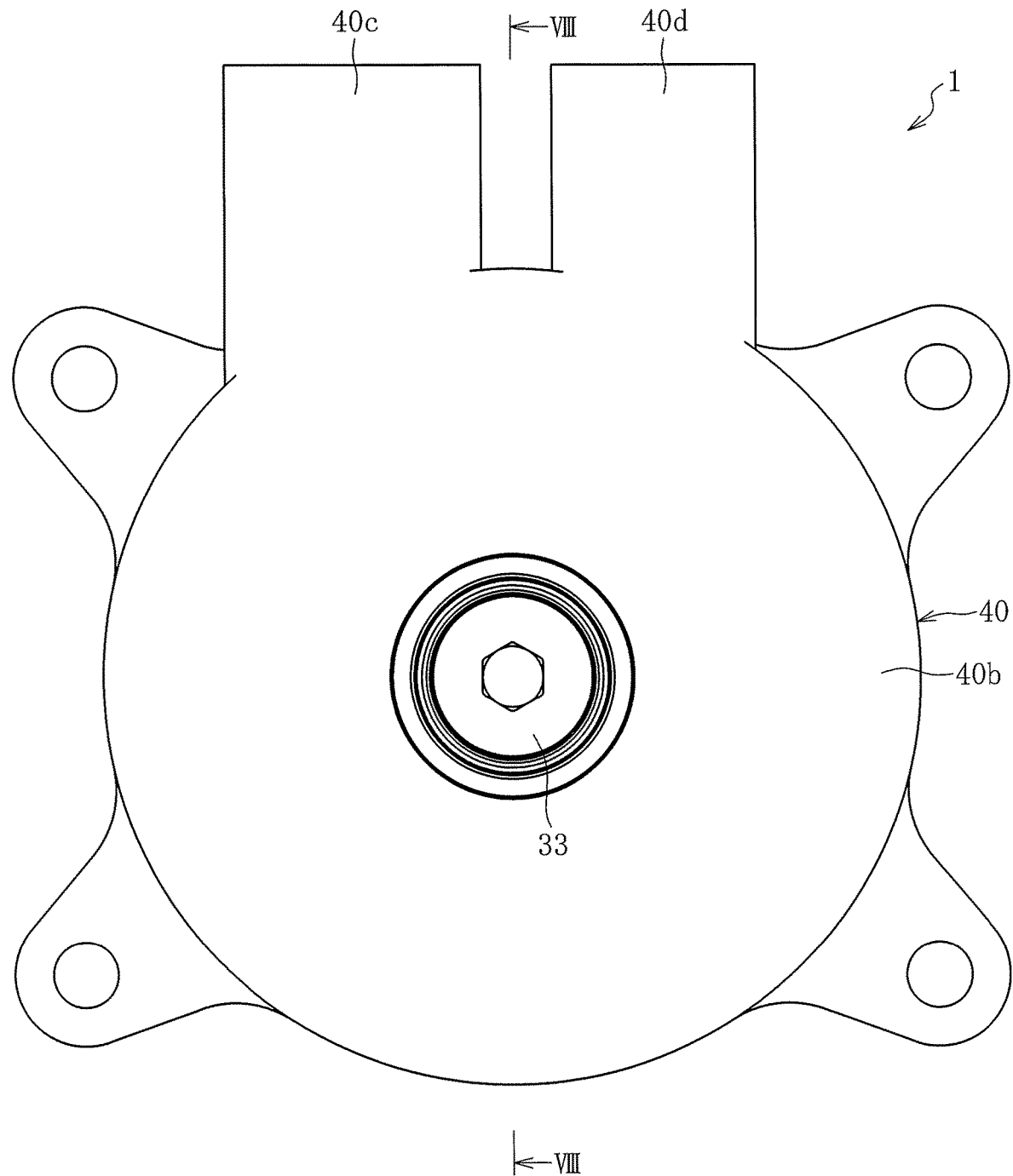
FIG. 9 is a front view of the above electric actuator as viewed from the side opposite to a cylinder head.

The casing 40 is a stationary member that stands still in place without rotating. For convenience of assembly, the casing 40 is divided into a bottomed cylindrical casing main body 40a as a first casing member and a lid portion 40b as a second casing member. The casing main body 40a and the lid portion 40b are integrated into one body by using a fastening means such as a bolt. The casing main body 40a integrally includes: a cylindrical portion 40a1; and a flange portion 40a2 extending from an end part, of the cylindrical portion 40a1, on the cylinder head 10 side toward the inner diameter side. The lid portion 40b is provided with tubular protrusions 40c and 40d (see FIG. 9) for leading out a power supply line for supplying power to the stator 41 and a signal line connected to a rotation speed detection sensor (not shown) for detecting a rotation speed of the rotor 42.

A bearing 12 is provided between an inner peripheral surface of the flange portion 40a2 of the casing main body 40a and the outer peripheral surface of the drive rotating body 2, so that the drive rotating body 2 is rotatably supported on the casing 40. In addition, a bearing 13 is provided between an inner peripheral surface of the lid portion 40b and an outer peripheral surface of the driven gear 32 of the driven rotating body 3, whereby an end part, of the driven rotating body 3, on the side opposite to the cylinder head 10 is rotatably supported with respect to the casing 40. As the bearings 12 and 13, for example, rolling bearings, specifically, ball bearings can be used, and deep groove ball bearings are used in the illustrated example. An outer race of the bearing 12 is fixed to an inner peripheral surface of the casing main body 40a, and an inner race of the bearing 12 is fixed to the outer peripheral surface of the drive rotating body 2. The outer race of the bearing 13 is fixed to the inner peripheral surface of the lid portion 40b of the casing 40, and the inner race of the bearing 12 is fixed to an outer peripheral surface of the driven rotating body 3.

Figure 10:
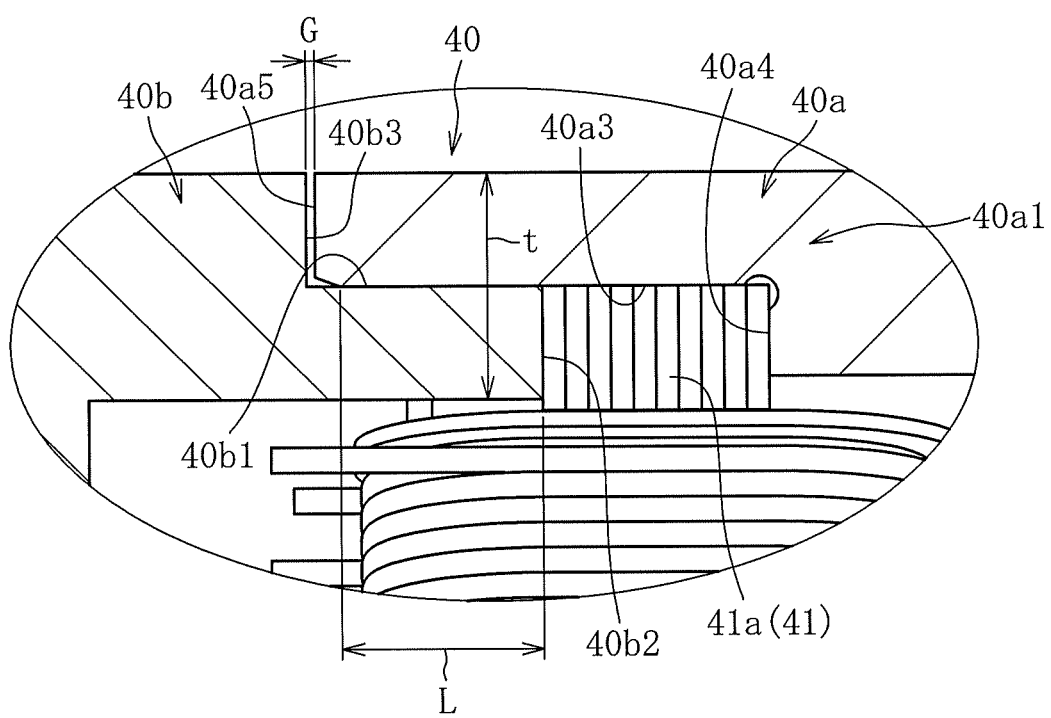
FIG. 10 is an enlarged view of FIG. 8.

As shown in an enlarged view in FIG. 10, the following two members are fitted to each other: a cylindrical surface-shaped inner peripheral surface 40a3 provided in the vicinity of an end part, of the main body 40a of the casing 40, on the side opposite to the cylinder head 10 (left side in the drawing); and a cylindrical surface-shaped outer peripheral surface 40b1 provided in the vicinity of an end part, of the lid portion 40b, on the cylinder head 10 side (right side in the drawing). Thus, the main body 40a and the lid portion 40b are centered to each other.

To an inner peripheral surface 40a3 of the casing main body 40a is fitted an outer peripheral surface of the stator 41, that is, a cylindrical surface-shaped outer peripheral surface of the stator core 41a in the illustrated example. With this arrangement, the main body 40a and the stator 41 are centered to each other. In this state, the stator 41 is sandwiched and fixed from both axial sides by the main body 40a and the lid portion 40b of the casing. Specifically, the stator core 41a is sandwiched and fixed from both axial sides by a step portion 40a4 provided on the inner peripheral surface of the main body 40a and an end portion 40b2, of the lid portion 40b, on the cylinder head 10 side. In the present embodiment, no adhesive or the like is interposed between the outer peripheral surface of the stator 41 and the inner peripheral surface of the casing main body 40a, and the stator 41 is fixed to the casing 40 only by being sandwiched by the casing main body 40a and the lid portion 40b. At this state, an end portion 40a5, of the main body 40a, on the side opposite to the cylinder head 10 and a step portion 40b3 provided on the outer peripheral surface of the lid portion 40b are not in contact with each other in the axial direction, and a gap G is provided in the axial direction between the end portion 40a5 and the step portion 40b3.

If an axial length L of a fitting region between the casing main body 40a and the lid portion 40b is too short, a coaxiality between the casing main body 40a and the lid portion 40b may be insufficient. Therefore, it is preferable that the axial length L of the fitting region of the two members be, for example, one time or more and preferably two times or more of a wall thickness t of the casing 40 in the fitting region. In the fitting region between the casing main body 40a and the lid portion 40b, the casing main body and the lid portion overlap each other in the radial direction, so that the thickness in the radial direction tends to be large. Therefore, it is preferable to form each member as thin as possible in the fitting region between the two. In this case, if the axial length L of the fitting region between the two is too long, the strength of each thinly formed member may be insufficient. Therefore, it is preferable that the fitting region between the casing main body 40a and the lid portion 40b be made as small as possible within a range in which coaxiality between the casing main body and the lid portion can be secured.

The stator 41 is fixed to the casing 40 in the following procedure. First, the stator 41 is assembled by attaching the bobbins 41b around which the stator coils 41c are wound to the stator core 41a. Then, the stator 41 is inserted into an inner periphery of the casing main body 40a from the side opposite to the cylinder head 10, and the end face, of the stator core 41a, on the cylinder head 10 side is brought into contact with the step portion 40a4 of the casing main body 40a while fitting the outer peripheral surface of the stator core 41a and the inner peripheral surface 40a3 of the main body 40a to each other. Thereafter, the end part, of the lid portion 40b, on the cylinder head 10 side is inserted into the inner periphery of the casing main body 40a from the side opposite to the cylinder head 10, so that the outer peripheral surface 40b1 of the lid portion 40b and the inner peripheral surface 40a3 of the main body 40a are fitted to each other. Then, the stator core 41a is sandwiched between the end portion 40b2, of the lid portion 40b, on the cylinder head 10 side and the step portion 40a4 of the casing main body 40a from both axial sides. In this state, since the axial gap G remains between the end portion 40a5, of the casing main body 40a, on the side opposite to the cylinder head 10 and the step portion 40b3 of the lid portion 40b on the cylinder head 10 side, the stator core 41a can be reliably sandwiched from both axial sides by the casing main body 40a and the lid portion 40b. In this state, the assembly of the electric motor 4 is completed by fixing the casing main body 40a and the lid portion 40b with a bolt or the like.

As described above, since the stator 41 is sandwiched and fixed between the casing main body 40a and the lid portion 40b, axial movement of the stator 41 with respect to the casing 40 is completely restricted, so that the stator 41 and the casing 40 can be fixed to each other highly reliably without axial backlash. In particular, in the present embodiment, as will be described later, the planetary rotating body 52 revolves (eccentrically rotates) about the rotation axis O to cause whirling of the eccentric member 51, and this whirling vibration is transmitted to the casing 40. Even in this case, since the stator 41 is sandwiched and fixed by the casing main body 40a and the lid portion 40b, positional displacement of the stator 41 with respect to the casing 40 is prevented, and deterioration of motor performance can be avoided.

As described above, in the step of fixing the casing main body 40a and the lid portion 40b to each other, the stator 41 can be fixed to be positioned in the radial direction and the axial direction with respect to the casing 40. Therefore, the number of steps is reduced as compared with the case where these steps are performed in separate steps, and the productivity is therefore improved.

In the above example, the outer peripheral surface 40b1 of the lid portion 40b and the outer peripheral surface of the stator core 41a are fitted to the inner peripheral surface 40a3 of the casing main body 40a. However, to the contrary, the outer peripheral surface of the casing main body 40a and the outer peripheral surface of the stator core 41a may be fitted to the inner peripheral surface of the lid portion 40b. In other words, the casing main body 40a may be made to serve as the second casing member, and the lid portion 40b may be made to serve as the first casing member.

The differential 5 includes, as main constituent elements: the eccentric member 51 as a motor shaft that rotates integrally with the rotor 42; the planetary rotating body 52 disposed on an inner periphery of the eccentric member 51; bearings 53 and 54 disposed between the eccentric member 51 and the planetary rotating body 52; a first speed reducer 5a provided between the planetary rotating body 52 and the drive rotating body 2; and a second speed reducer 5b provided between the planetary rotating body 52 and the driven rotating body 3.

The eccentric member 51 has, as a whole, a cylindrical shape with both axial ends opened. The eccentric member 51 in the illustrated example integrally includes: a first tubular portion 51a fixed to an inner periphery of the rotor core 42a; a second tubular portion 51b that is formed to have a larger diameter than the first tubular portion 51a and protrudes from the first tubular portion 51a toward the cylinder head 10 side; and a third tubular portion 51c protruding from the first tubular portion 51a toward the side opposite to the cylinder head 10. An outer peripheral surface of each of the tubular portions 51a, 51b, and 51c of the eccentric member 51 is a cylindrical surface formed coaxially with the rotation axis O. On the inner peripheral surfaces of the first tubular portion 51a and the second tubular portion 51b of the eccentric member 51, there are formed cylindrical surface-shaped eccentric inner peripheral surfaces 51a1 and 51b1 eccentric to the rotation axis O. An inner peripheral surface of the third tubular portion 51c of the eccentric member 51 is a cylindrical surface formed coaxially with the rotation axis O. The eccentric member 51 has a thick part and a thin part when viewed on a radial cross-section passing through the eccentric inner peripheral surfaces 51a1 and 51b1 (see FIGS. 11 and 12).

As shown in FIG. 8, an end part, of the eccentric member 51, on the cylinder head 10 side is rotatably supported with respect to the casing 40 by a bearing 14. The bearing 14 is configured with, for example, a rolling bearing (deep groove ball bearing). In the present embodiment, an outer race of the bearing 14 is fixed to the inner peripheral surface of the casing main body 40a, and an inner race of the bearing 14 is fixed to the outer peripheral surface of the second tubular portion 51b of the eccentric member 51.

The planetary rotating body 52 has, as a whole, a cylindrical shape with both axial ends opened. The planetary rotating body 52 in the illustrated example integrally includes a first tubular portion 52a and a second tubular portion 52b provided on the side, of the first tubular portion 52a, opposite to the cylinder head 10 (left side in the drawing). A first inner teeth portion 57 is formed on an inner peripheral surface of the first tubular portion 52a, and a second inner teeth portion 58 is formed on an inner peripheral surface of the second tubular portion 52b. Each of the first inner teeth portion 57 and the second inner teeth portion 58 is configured with a plurality of teeth whose radial cross-section is a curve (for example, a trochoidal curve). A pitch circle diameter of the second inner teeth portion 58 is smaller than a pitch circle diameter of the first inner teeth portion 57. The number of teeth of the second inner teeth portion 58 is smaller than the number of teeth of the first inner teeth portion 57.

The first inner teeth portion 57 of the planetary rotating body 52 meshes with the first outer teeth portion 55 provided on an outer peripheral surface of the small diameter portion 21 of the drive rotating body 2. The second inner teeth portion 58 of the planetary rotating body 52 meshes with the second outer teeth portion 56 provided on the outer peripheral surface of the driven gear 32 of the driven rotating body 3. Each of the first outer teeth portion 55 and the second outer teeth portion 56 is configured with a plurality of teeth whose radial cross-section is a curve (for example, a trochoidal curve). A pitch circle diameter of the second outer teeth portion 56 is smaller than a pitch circle diameter of the first outer teeth portion 55, and the number of teeth of the second outer teeth portion 56 is smaller than the number of teeth of the first outer teeth portion 55.

The number of teeth of the first outer teeth portion 55 is smaller than the number of teeth of the first inner teeth portion 57 meshing with the first outer teeth portion 55, and is preferably smaller by one. Similarly, the number of teeth of the second outer teeth portion 56 is also smaller than the number of teeth of the second inner teeth portion 58 meshing with the second outer teeth portion 56, and is preferably smaller by one. As an example, in the present embodiment, the number of teeth of the first inner teeth portion 57 is 24, the number of teeth of the second inner teeth portion 58 is 20, the number of teeth of the first outer teeth portion 55 is 23, and the number of teeth of the second outer teeth portion 56 is 19.

The first inner teeth portion 57 and the first outer teeth portion 55 that mesh with each other constitute a first speed reducer 5a, and the second inner teeth portion 58 and the second outer teeth portion 56 constitute a second speed reducer 5b. The first speed reducer 5a and the second speed reducer 5b are each so-called a cycloidal speed reducer. The reduction ratios of the two speed reducers 5a and 5b are different, and in the present embodiment, the reduction ratio of the first speed reducer 5a is made larger than the reduction ratio of the second speed reducer 5b. By making the reduction ratios of the two speed reducers 5a and 5b different in this manner, it is possible to change (differentiate) the rotation of the output shaft 31 driven by the engine depending on an operation state of the electric motor 4 as will be described later.

The bearing 53 is configured with, for example, a rolling bearing, and is configured with a needle roller bearing in the illustrated example. The bearing 53 is disposed between the eccentric inner peripheral surface 51a1 of the first tubular portion 51a of the eccentric member 51 and a cylindrical surface-shaped outer peripheral surface of the second tubular portion 52b of the planetary rotating body 52. Therefore, a center P (see FIG. 11) of the outer peripheral surface and the inner peripheral surface of the second tubular portion 52b of the planetary rotating body 52 are at a position eccentric to the rotation axis O. The bearing 54 is configured with, for example, a rolling bearing, and is configured with a deep groove ball bearing in the illustrated example. The bearing 54 is disposed between the eccentric inner peripheral surface 51b1 of the second tubular portion 51b of the eccentric member 51 and a cylindrical surface-shaped outer peripheral surface of the first tubular portion 52a of the planetary rotating body 52. Therefore, the center P (see FIG. 11) of the outer peripheral surface and the inner peripheral surface of the first tubular portion 52a of the planetary rotating body 52 are at a position eccentric to the rotation axis O. The bearings 53 and 54 support the planetary rotating body 52 to be relatively rotatable with respect to the eccentric member 51.

Figure 11:
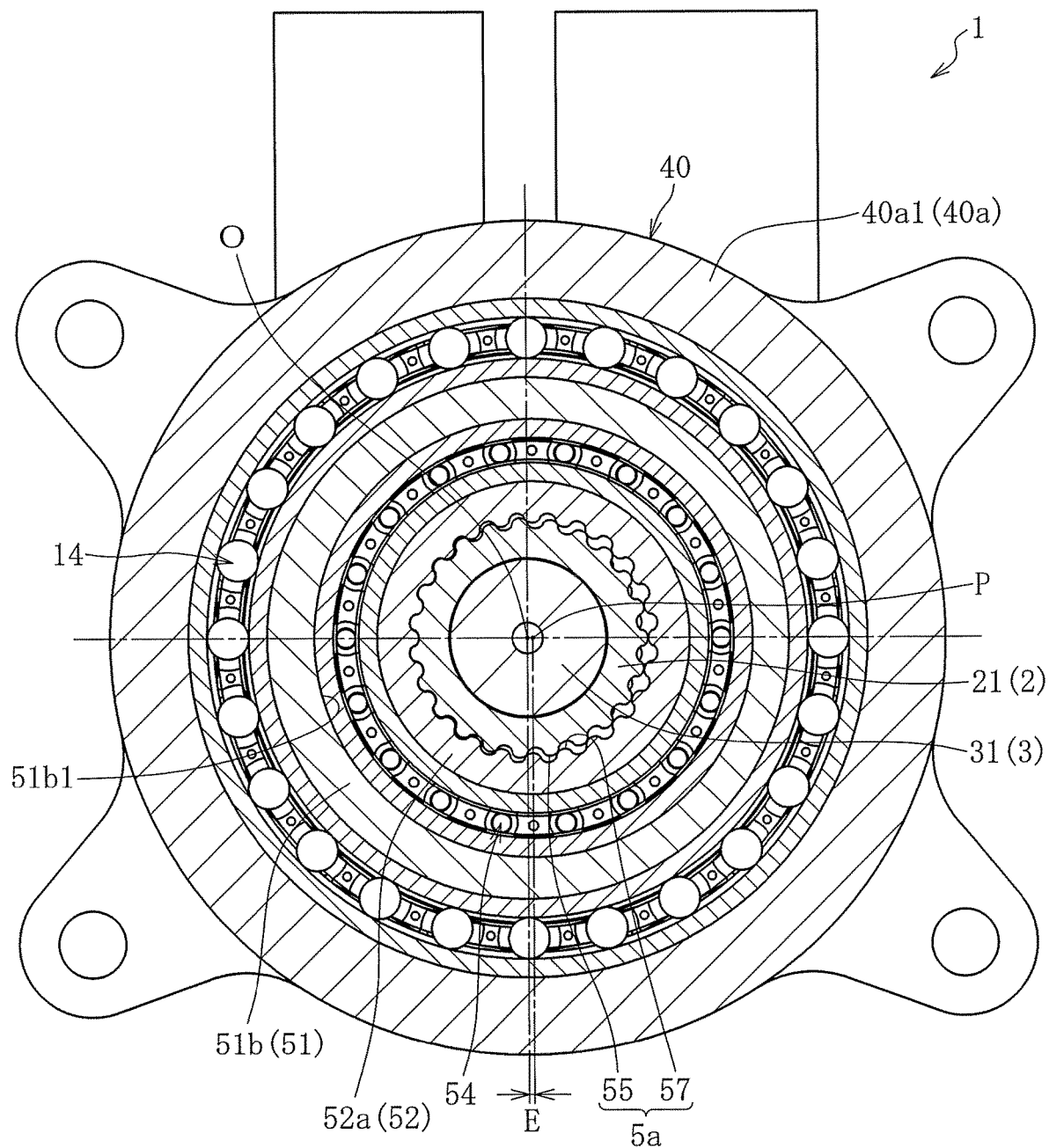
FIG. 11 is a cross-sectional view taken along line XI-XI in FIG. 8.
Figure 12:
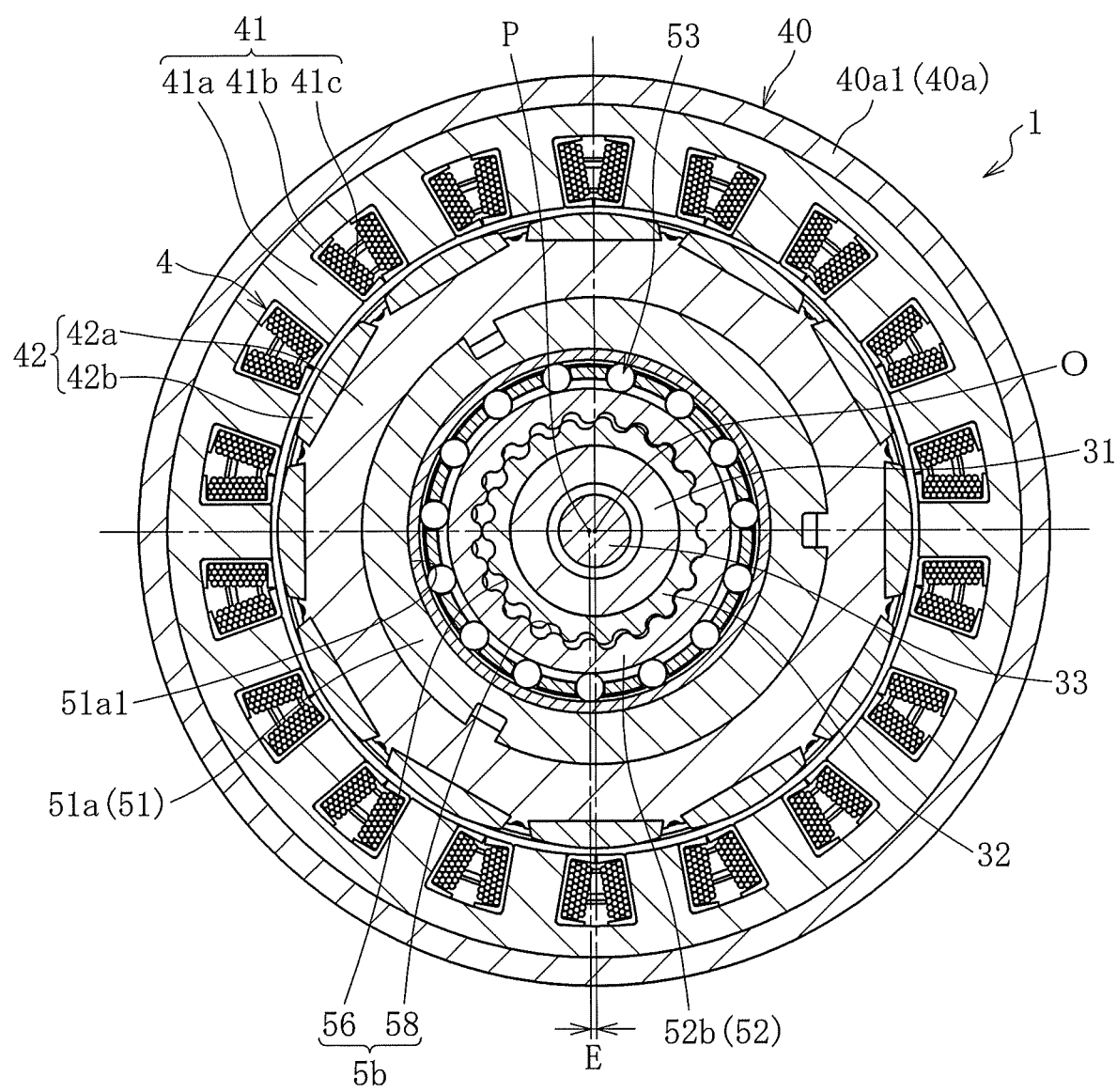
FIG. 12 is a cross-sectional view taken along line XII-XII in FIG. 8.

FIG. 11 is a cross-sectional view taken along a first speed reducer 5a (a cross-sectional view taken along line XI-XI in FIG. 1), and FIG. 12 is a cross-sectional view taken along a second speed reducer 5b (a cross-sectional view taken along line XII-XII in FIG. 1).

As shown in FIG. 11, the center P of the first inner teeth portion 57 is eccentric by a distance E in the radial direction with respect to the rotation axis O. Therefore, the first inner teeth portion 57 and the first outer teeth portion 55 mesh with each other in a partial region in the circumferential direction, and do not mesh with each other in a region on the side opposite to this partial region in the radial direction. Further, as shown in FIG. 12, since the center P of the second inner teeth portion 58 is also eccentric by a distance E in the radial direction with respect to the rotation axis O, the second inner teeth portion 58 and the second outer teeth portion 56 mesh with each other in a partial region in the circumferential direction, and do not mesh with each other in a region on the side opposite to this partial region in the radial direction. Because the view directions are different between FIGS. 11 and 12, the drawings show that the first inner teeth portion 57 and the second inner teeth portion 58 are eccentric to each other in laterally opposite directions, but the first inner teeth portion 57 and the second inner teeth portion 58 are eccentric in the same direction by the same distance E.

Here, when a reduction ratio of the differential 5 is i, a motor rotation speed is nm, and a rotation speed of the sprocket 20 is nS, an output rotation phase angle difference is represented by the formula (nm−nS)/i.

When the reduction ratio of the first speed reducer 5a is i1 and the reduction ratio of the second speed reducer 5b is i2, the reduction ratio of the differential 5 is obtained by the following Equation 1.

$$\text{Reduction ratio} = i1 \times i2 / |i1 - i2| \qquad \text{Equation 1}$$

For example, when the reduction ratio i1 of the first speed reducer 5a is 24/23 and the reduction ratio i2 of the second speed reducer 5b is 20/19, the reduction ratio is 120 according to the above Equation 1. As described above, with the differential 5, it is possible to obtain a high torque with a large reduction ratio.

In the electric actuator 1, since the drive rotating body 2 (small diameter portion 21) and the driven rotating body 3 (output shaft 31 and driven gear 32) are disposed on an inner periphery of the planetary rotating body 52, it is possible to adopt a layout in which a hollow motor is adopted as the electric motor 4 that drives the planetary rotating body 52, and the hollow motor can be disposed on the outer diameter side of the planetary rotating body 52. As a result, space efficiency is improved, and there is an advantage that the electric actuator can be made compact (in particular, the axial dimension can be made compact).

Next, an operation of the above electric actuator 1 will be described with reference to FIGS. 8 to 12.

During the operation of the engine, the drive rotating body 2 rotates by the driving force transmitted from the engine to the sprocket 20. In a state where the electric motor 4 is not energized and there is therefor no input from the electric motor 4 to the differential 5, the rotation of the drive rotating body 2 is transmitted to the driven rotating body 3 via the planetary rotating body 52, and the driven rotating body 3 rotates in synchronism with the drive rotating body 2. Specifically, the drive rotating body 2 and the planetary rotating body 52, and the planetary rotating body 52 and the driven rotating body 3 are engaged with each other via the teeth (first outer teeth portion 55 and first inner teeth portion 57, and second outer teeth portion 56 and second inner teeth portion 58) provided on each rotating body such that torque can be transmitted to each other; therefore, when the drive rotating body 2 rotates, the drive rotating body 2, the planetary rotating body 52, and the driven rotating body 3 rotate in synchronism with each other while maintaining the engagement relationship. As a result, the sprocket 20 provided on the drive rotating body 2 and the camshaft connected to the output shaft 31 of the driven rotating body 3 rotate in synchronism with each other.

After that, for example, when the engine shifts to a low rotation range such as an idle operation, the electric motor 4 is energized by a known means such as electronic control so as to integrally rotate the rotor 42 and the eccentric member 51 connected to the rotor 42, about the rotation axis O. As a result, the eccentric inner peripheral surfaces $51a1$ and $51b1$ of the eccentric member 51, the bearings 53 and 54, and the planetary rotating body 52 perform an eccentric motion (revolution) about the rotation axis O. Each time the eccentric member 51 makes one rotation, each of the engagement part between the first inner teeth portion 57 and the first outer teeth portion 55, and the engagement part between the second inner teeth portion 58 and the second outer teeth portion 56 is shifted by one tooth in the circumferential direction. At this time, since there is a difference between the reduction ratio of the first speed reducer (first inner teeth portion 57 and first outer teeth portion 55) and the reduction ratio of the second speed reducer (second inner teeth portion 58 and second outer teeth portion 56), there is a difference between the phase change amounts, of the drive rotating body 2 and the driven rotating body 3, associated with the rotation of the eccentric member 51, and the drive rotating body 2 and the driven rotating body 3 come into a differential state and rotate relatively to each other. As a result, the relative rotation phase difference of the driven rotating body 3 with respect to the drive rotating body 2 can be changed in forward and reverse directions, and the opening and closing timings of the valves by the cams of the camshaft can be changed in the advance direction or the retard direction.

Since the opening and closing timings of the valves are changed in this manner, it is possible to stabilize the rotation of the engine and improve the fuel efficiency during the idle operation. Further, when the operation of the engine shifts from the idle state to a normal operation and shifts, for example, to high speed rotation, the rotation phase difference of the output shaft 31 and the camshaft coupled to the output shaft 31 with respect to the sprocket 20 can be changed to the rotation phase difference suitable for the high speed rotation by increasing the speed difference of the relative rotation of the electric motor 4 with respect to the sprocket 20, so that the output of the engine can be increased.

Figure 13:
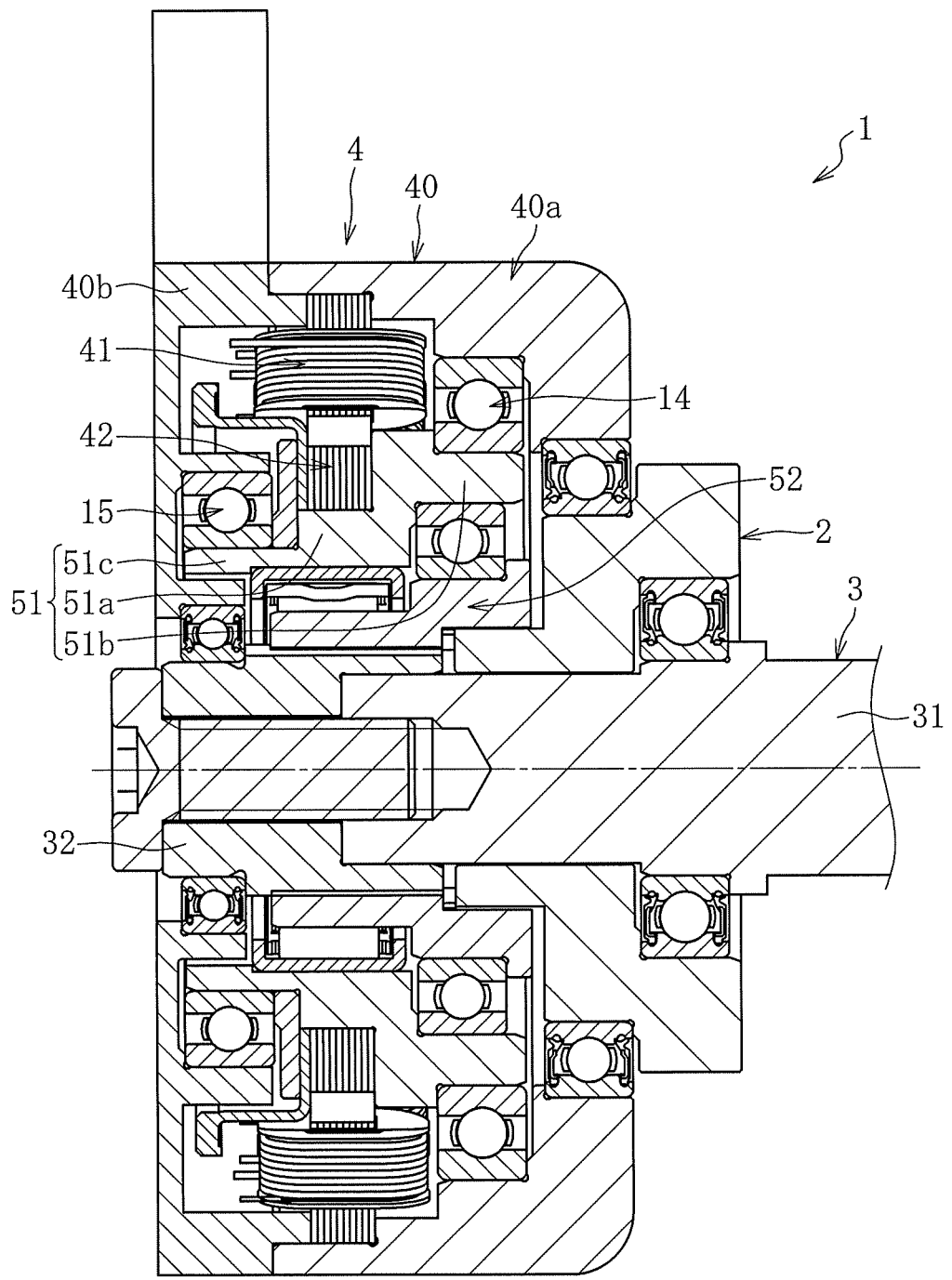
FIG. 13 is a cross-sectional view of an electric actuator.

The configuration of the electric actuator is not limited to the above-described configuration. For example, in the electric actuator shown in FIG. 13, the end parts on both axial sides of the eccentric member 51 are rotatably supported with respect to the casing 40 by bearings 14 and 15. Specifically, the end part, of the eccentric member 51, on the cylinder head 10 side is rotatably supported on the casing main body 40a via the bearing 14 (first bearing), and the end part, of the eccentric member 51, on the side opposite to the cylinder head 10 is rotatably supported on the lid portion 40b via a bearing 15 (second bearing). The bearing 15 configured with, for example, a rolling bearing (deep groove ball bearing). In this configuration, the outer race of the bearing 15 is fixed to the inner peripheral surface of the lid portion 40b of the casing 40, and the inner race of the bearing 15 is fixed to the outer peripheral surface of the third tubular portion 51c of the eccentric member 51. Since both axial ends of the eccentric member 51 are supported on the casing 40 via the bearings 14 and 15 in this manner, rotational stability of the eccentric member 51 is improved. In particular, in the electric actuator 1, since the planetary rotating body 52 revolves about the rotation axis O, the eccentric member 51 whirls; therefore, it is preferable that the end parts on both axial sides of the eccentric member 51 be rotatably supported by the bearings 14 and 15.

The above description has exemplified the case where the cycloid speed reducers are used as the first speed reducer 5a and the second speed reducer 5b. However, it is possible to use, for the differential 5, speed reducers each having an arbitrary configuration (cycloidal speed reducer, harmonic drive gearing device, planetary gear device, and the like) as long as the speed reducers each have a planetary rotating body 52 that rotates and revolves and as long as the reduction ratios of the two speed reducers 5a and 5b are different. It is also possible to use a speed reducer of a type in which a roller assembly retaining a plurality of rollers by a cage is used instead of the planetary rotating body 52 and in which the rollers are rolled along the first outer teeth portion 55 and the second outer teeth portion 56.

The electric motor described above can also be applied to the electric actuator shown in FIGS. 1 to 5. Specifically, as the electric motor 4 of the electric actuator 1 shown in FIGS. 1 to 5, it is possible to use an electric motor having one or both of the following two features.

(1) An electric motor including: a casing; a stator fixed to an inner periphery of the casing; and a rotor rotatable with respect to the casing about a rotation axis. The casing includes: a first casing member; and a second casing member. An outer peripheral surface of the second casing member and an outer peripheral surface of the stator are fit to an inner peripheral surface of the first casing member, and the first casing member and the second casing member sandwich and fix the stator from both axial sides.

(2) An electric motor that is provided with: a motor shaft that rotates integrally with the rotor; a first bearing that rotatably supports one axial end part of the motor shaft with respect to the first casing member; and a second bearing that rotatably supports the other axial end part of the motor shaft with respect to the second casing member.

Hereinafter, other examples of the electric actuator will be described with reference to the accompanying drawings. In the drawings below for describing other examples, constituent elements such as members and component parts having the same function or shape are denoted by the same reference signs as long as they can be discriminated, and the description thereof will be omitted after once described.

Figure 14:
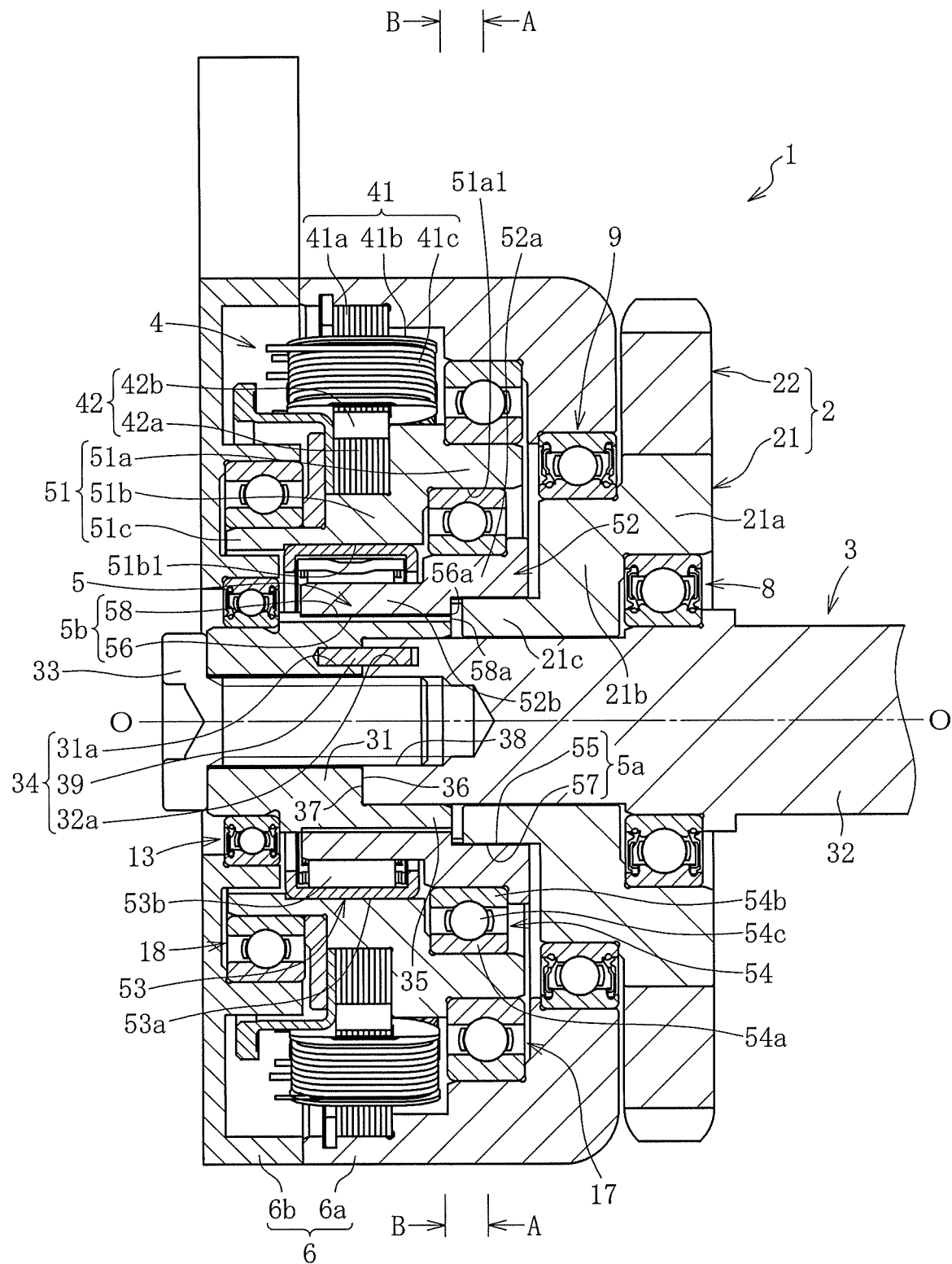
FIG. 14 is a cross-sectional view of an electric actuator.
Figure 15:
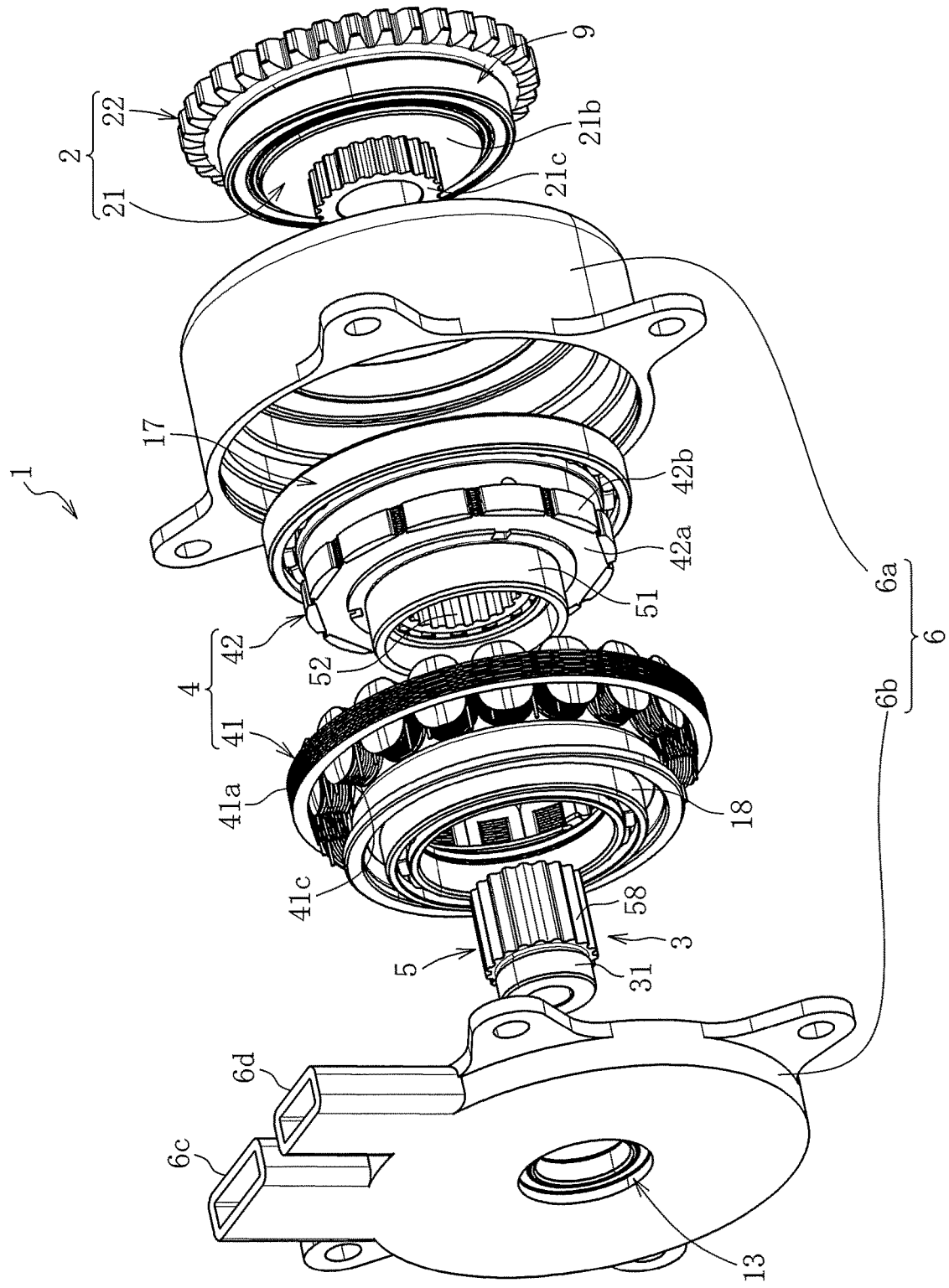
FIG. 15 is an exploded perspective view of an electric actuator.
Figure 16:
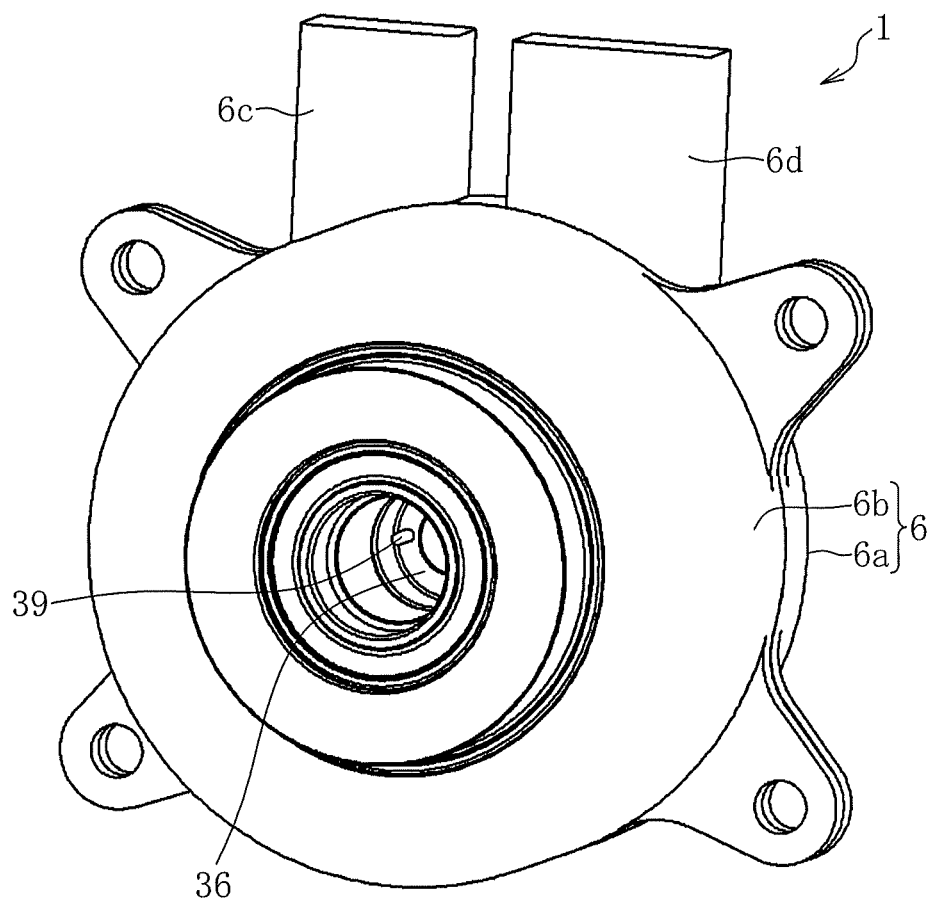
FIG. 16 is a perspective view of an electric actuator.
Figure 17:
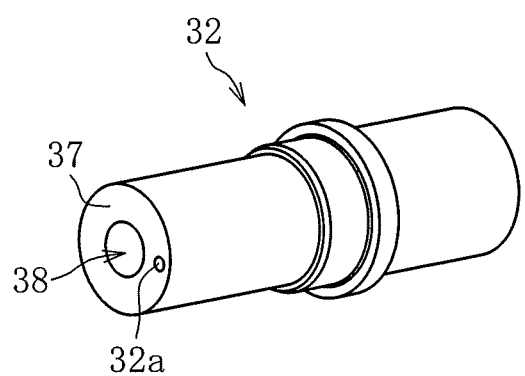
FIG. 17 is a perspective view of a camshaft.

FIGS. 14 to 19 show a first example of the electric actuator. FIG. 14 is a vertical cross-sectional view of the electric actuator, and FIG. 15 is an exploded perspective view of the electric actuator. FIG. 16 is a perspective view of the electric actuator when a main body of a driven rotating body is removed, and FIG. 17 is a perspective view of a camshaft on the driven rotating body. The electric actuator is used as, for example, a variable valve timing device for an engine (driving source), but is not limited to this application.

As shown in FIGS. 14 and 15, the electric actuator 1 includes, as main constituent elements: a drive rotating body 2; a driven rotating body 3; an electric motor 4; a differential 5; and a casing 6 that houses the drive rotating body 2, the driven rotating body 3, the electric motor 4, and the differential 5.

The drive rotating body 2 is configured, as a whole, in a cylindrical shape with both axial ends opened, and includes a main body 21 and a sprocket 22 serving as an input member of a driving force from an engine. The main body 21 and the sprocket 22 are both disposed coaxially about the rotation axis O. Therefore, the main body 21 and the sprocket 22 integrally rotate about the rotation axis O by the driving force from the engine.

The main body 21 includes: a first tubular portion 21a on which the sprocket 22 is provided; a second tubular portion 21b supported on the casing 6; and a third tubular portion 21c functioning as a part of the differential 5. The sprocket 22 is provided on the first tubular portion 21a of the main body 21 to be able to transmit torque, and is rotationally driven by the driving force transmitted from the engine via a chain.

The driven rotating body 3 is a member that outputs the driving force transmitted from the drive rotating body 2, and includes a main body 31, a camshaft 32, a center bolt 33, and a positional displacement prevention member 34.

The main body 31 is configured in a cylindrical shape with both axial ends opened, and has a shaft housing portion 35 for housing the camshaft 32 at one end of the main body 31. The shaft housing portion 35 is configured in a tubular shape, and has a contact surface 36 that can axially come into contact with the camshaft 32.

The camshaft 32 includes one or a plurality of cams (not illustrated), and is configured to drive at least one of an intake valve and an exhaust valve of the engine. As shown in FIGS. 1, 3, and 4, the camshaft 32 has an end face 37 that comes into contact with the contact surface 36 of the shaft housing portion 35 of the main body 31, and a screw hole 38 formed in the end face 37.

The main body 31 and the camshaft 32 are coupled to each other by inserting the end part of the camshaft 32 into the shaft housing portion 35 of the main body 31 and screwing a shaft portion of the center bolt 33 inserted in the main body 31, into the screw hole 38. With this coupling, the main body 31 and the camshaft 32 are coaxially disposed on the rotation axis O and integrally rotate about the rotation axis O.

The positional displacement prevention member 34 is disposed between the main body 31 and the camshaft 32 and inside the rotor 42 (rotor core 42a). The positional displacement prevention member 34 is configured with a coupling pin 39, a first hole 31a formed in the main body 31, and a second hole 32a formed in the camshaft 32.

The coupling pin 39 is configured in a round bar shape. One end of the coupling pin 39 is inserted in the first hole 31a, and the other end is inserted in the second hole 32a. The first hole 31a is formed in the contact surface 36 of the shaft housing portion 35 of the main body 31. The first hole 31a is a hole that is formed parallel to a shaft center (rotation axis O) of the main body 31 and has a cylindrical inner peripheral surface. The second hole 32a is formed in the end face 37 of the camshaft 32. The second hole 32a is a hole that is formed parallel to a shaft center (rotation axis O) of the camshaft 32 and has a cylindrical inner peripheral surface.

A sum of a depth dimension of the first hole 31a and a depth dimension of the second hole 32a is set larger than a length dimension of the coupling pin 39. With this configuration, the contact surface 36 of the shaft housing portion 35 and the end face of the camshaft 32 come into contact with each other with the coupling pin 39 inserted in the first hole 31a and the second hole 32a and with the main body 31 and the camshaft 32 coupled to each other by the center bolt 33.

The positional displacement prevention member 34 can prevent relative positional displacement between the main body 31 and the camshaft 32 in the circumferential direction (direction of rotation) due to the coupling pin 39 inserted in the first hole 31a and the second hole 32a. This configuration prevents the center bolt 33 from getting loose and can reliably prevent torque transmission loss. Therefore, reliability of the electric actuator 1 can be improved.

A bearing 8 is disposed between an outer peripheral surface of the camshaft 32 and an inner peripheral surface of the first tubular portion 21a of the main body 21 of the drive rotating body 2. A bearing 9 is disposed between an outer peripheral surface of the second tubular portion 21b of the main body 21 of the drive rotating body 2 and the casing 6. These bearings 8 and 9 allow relative rotation between the drive rotating body 2 and the driven rotating body 3. The bearings 8 and 9 are configured with rolling bearings, but are not limited to rolling bearings, and can be configured with plain bearings or other bearings.

For convenience of assembly, the casing 6 is divided into a bottomed cylindrical casing main body 6a and a lid portion 6b. The casing main body 6a and the lid portion 6b are integrated into one body by using fastening means such as bolts. The lid portion 6b is provided with tubular protrusions 6c and 6d (see FIG. 15) for leading out a power supply line for supplying power to the electric motor 4 and a signal line connected to a rotation speed detection sensor (not shown) for detecting a rotation speed of the electric motor 4. A bearing 13 is disposed between an inner peripheral surface of the lid portion 6b of the casing 6 and an outer peripheral surface of the main body 31 of the driven rotating body 3.

The electric motor 4 is a radial gap type motor having: a stator 41 fixed to the casing main body 6a; and a rotor 42 arranged on the radially inner side of the stator with a gap so as to face the stator 41. The stator 41 is configured with: a stator core 41a including a plurality of magnetic steel sheets laminated axially; bobbins 41b each mounted on the stator core 41a and made of an insulating material; and stator coils 41c wound around the bobbins 41b. The rotor 42 is configured with an annular or tubular rotor core (rotor inner) 42a and a plurality of magnets 42b attached to the rotor core 42a. The electric motor 4 rotates the rotor 42 about the rotation axis O by an excitation force acting between the stator 41 and the rotor 42.

The differential 5 includes, as main constituent elements: the main body 21 of the drive rotating body 2; the main body 31 of the driven rotating body 3; the eccentric member 51 that rotates integrally with the rotor 42; the planetary rotating body 52 disposed on an inner periphery of the eccentric member 51; and a first bearing 53 and a second bearing 54 both disposed between the eccentric member 51 and the planetary rotating body 52.

The eccentric member 51 is configured in a cylindrical shape with both axial ends opened, and integrally includes: a large-diameter tubular portion 51a, a medium-diameter tubular portion 51b formed to have a smaller diameter than the large-diameter tubular portion 51a; and a small-diameter tubular portion 51c formed to have a smaller diameter than the medium-diameter tubular portion 51b.

The large-diameter tubular portion 51a protrudes axially from the medium-diameter tubular portion 51b so as not to overlap the rotor core 42a. The large-diameter tubular portion 51a is rotatably supported on the casing main body 6a of the casing 6 via a bearing 17. The medium-diameter tubular portion 51b is fixed to an inner periphery of the rotor core 42a to axially overlap the rotor core 42a. The small-diameter tubular portion 51c protrudes axially from the medium-diameter tubular portion 51b (protrudes to the side opposite to the large-diameter tubular portion 51a) so as no to overlap the rotor core 42a. The small-diameter tubular portion 51c is rotatably supported on the lid portion 6b of the casing 6 via a bearing 18.

An outer peripheral surface of the large-diameter tubular portion 51a, an outer peripheral surface of the medium-diameter tubular portion 51b, and an outer peripheral surface of the small-diameter tubular portion 51c are cylindrical surfaces formed coaxially with the rotation axis O. On an inner peripheral surface of the large-diameter tubular portion 51a of the eccentric member 51, there is formed a cylindrical surface-shaped eccentric inner peripheral surface 51a1 that is eccentric with respect to the rotation axis O. On an inner peripheral surface of the medium-diameter tubular portion 51b of the eccentric member 51, there is formed a cylindrical surface-shaped eccentric inner peripheral surface 51b1 that is eccentric with respect to the rotation axis O. The large-diameter tubular portion 51a and the medium-diameter tubular portion 51b of the eccentric member 51 each have a thick part and a thin part due to the relationship between the outer peripheral surfaces and the eccentric inner peripheral surfaces 51a1 and 51b1.

The planetary rotating body 52 is configured in a cylindrical shape with both axial ends opened, and includes a large-diameter tubular portion 52a and a small-diameter tubular portion 52b. A first inner teeth portion 55 is formed on an inner periphery of the large-diameter tubular portion 52a, and a second inner teeth portion 56 is formed on an inner periphery of the small-diameter tubular portion 52b. Each of the first inner teeth portion 55 and the second inner teeth portion 56 is configured with a plurality of teeth whose radial cross-section is a curve (for example, a trochoidal curve). The first inner teeth portion 55 and the second inner teeth portion 56 are formed at positions axially shifted to each other. A pitch circle diameter of the second inner teeth portion 56 is smaller than a pitch circle diameter of the first inner teeth portion 55. The number of teeth of the second inner teeth portion 56 is smaller than the number of teeth of the first inner teeth portion 55.

An end portion 56a, of the second inner teeth portion 56, on the first inner teeth portion 55 side in the tooth width direction is formed to axially overlap an outer peripheral surface of the large-diameter tubular portion 52a of the planetary rotating body 52. In other words, a part (end portion 56a) of the second inner teeth portion 56 is formed to overlap the second bearing 54 in the axial direction (tooth width direction).

A first outer teeth portion 57 meshing with the first inner teeth portion 55 is formed on an outer peripheral surface of the third tubular portion 21c of the main body 21 of the drive rotating body 2. A second outer teeth portion 58 meshing with the second inner teeth portion 56 is formed on the outer peripheral surface of the main body 31 of the driven rotating body 3. Each of the first outer teeth portion 57 and the second outer teeth portion 58 is configured with a plurality of teeth whose radial cross-section is a curve (for example, a trochoidal curve). A pitch circle diameter of the second outer teeth portion 58 is smaller than a pitch circle diameter of the first outer teeth portion 57, and the number of teeth of the second outer teeth portion 58 is smaller than the number of teeth of the first outer teeth portion 57.

One end portion 58a, of the second outer teeth portion 58, in the tooth width direction is disposed to axially overlap the outer peripheral surface of the large-diameter tubular portion 52a of the planetary rotating body 52. In other words, a part (end portion 58a) of the second outer teeth portion 58 is formed to overlap the second bearing 54 in the axial direction (tooth width direction).

The number of teeth of the first outer teeth portion 57 is smaller than the number of teeth of the first inner teeth portion 55 meshing with the first outer teeth portion 57, and is preferably smaller by one. Similarly, the number of teeth of the second outer teeth portion 58 is also smaller than the number of teeth of the second inner teeth portion 56 meshing with the second outer teeth portion 58, and is preferably smaller by one. As an example, in the present embodiment, the number of teeth of the first inner teeth portion 55 is 24, the number of teeth of the second inner teeth portion 56 is 20, the number of teeth of the first outer teeth portion 57 is 23, and the number of teeth of the second outer teeth portion 58 is 19.

The first inner teeth portion 55 and the first outer teeth portion 57 meshing with each other constitute a first speed reducer 5a, and the second inner teeth portion 56 and the second outer teeth portion 58 constitute a second speed reducer 5b. The first speed reducer 5a and the second speed reducer 5b are so-called a cycloidal speed reducer. The reduction ratios of the two speed reducers 5a and 5b are different, and in the present embodiment, the reduction ratio of the first speed reducer 5a is made larger than the reduction ratio of the second speed reducer 5b. By making the reduction ratios of the two speed reducers 5a and 5b different in this manner, it is possible to change (differentiate) the rotation of the camshaft 32 depending on an operation state of the electric motor 4.

The first bearing 53 is disposed between the eccentric inner peripheral surface 51b1 of the eccentric member 51 and the outer peripheral surface of the small-diameter tubular portion 52b of the planetary rotating body 52. Therefore, a center P of an outer peripheral surface and an inner peripheral surface of the planetary rotating body 52 is at a position eccentric to the rotation axis O. The first bearing 53 supports the planetary rotating body 52 to be relatively rotatable with respect to the eccentric member 51. The first bearing 53 is configured with, for example, a needle roller bearing having an outer race 53a and rolling elements 53b (needle rollers). The outer race 53a is fixed to the eccentric inner peripheral surface 51b1 of the medium-diameter tubular portion 51b of the eccentric member 51. The rolling elements 53b are in contact with the outer peripheral surface (rolling surface) of the small-diameter tubular portion 51c of the planetary rotating body 52.

The second bearing 54 is disposed at a position axially shifted from the first bearing 53 so as not to overlap the inner periphery of the rotor core 42a of the electric motor 4. Specifically, the second bearing 54 is disposed between the large-diameter tubular portion 52a of the planetary rotating body 52 and the eccentric inner peripheral surface 51a1 of the large-diameter tubular portion 51a of the eccentric member 51.

The second bearing 54 is configured with a deep groove ball bearing having an outer race 54a, an inner race 54b, and rolling elements 54c (balls). The outer race 54a of the second bearing 54 is fixed (press-fitted) to the eccentric inner peripheral surface 51a1 of the large-diameter tubular portion 51a of the eccentric member 51. The inner race 54b of the second bearing 54 is fixed (press-fitted) to the outer peripheral surface of the large-diameter tubular portion 52a of the planetary rotating body 52.

The second bearing 54 is disposed across the speed reducers 5a and 5b so as to support both the first speed reducer 5a and the second speed reducer 5b. Specifically, the second bearing 54 is disposed between the eccentric member 51 and the planetary rotating body 52 so as to axially overlap a part of the first speed reducer 5a and so as to axially overlap a part of the second speed reducer 5b.

Figure 18:
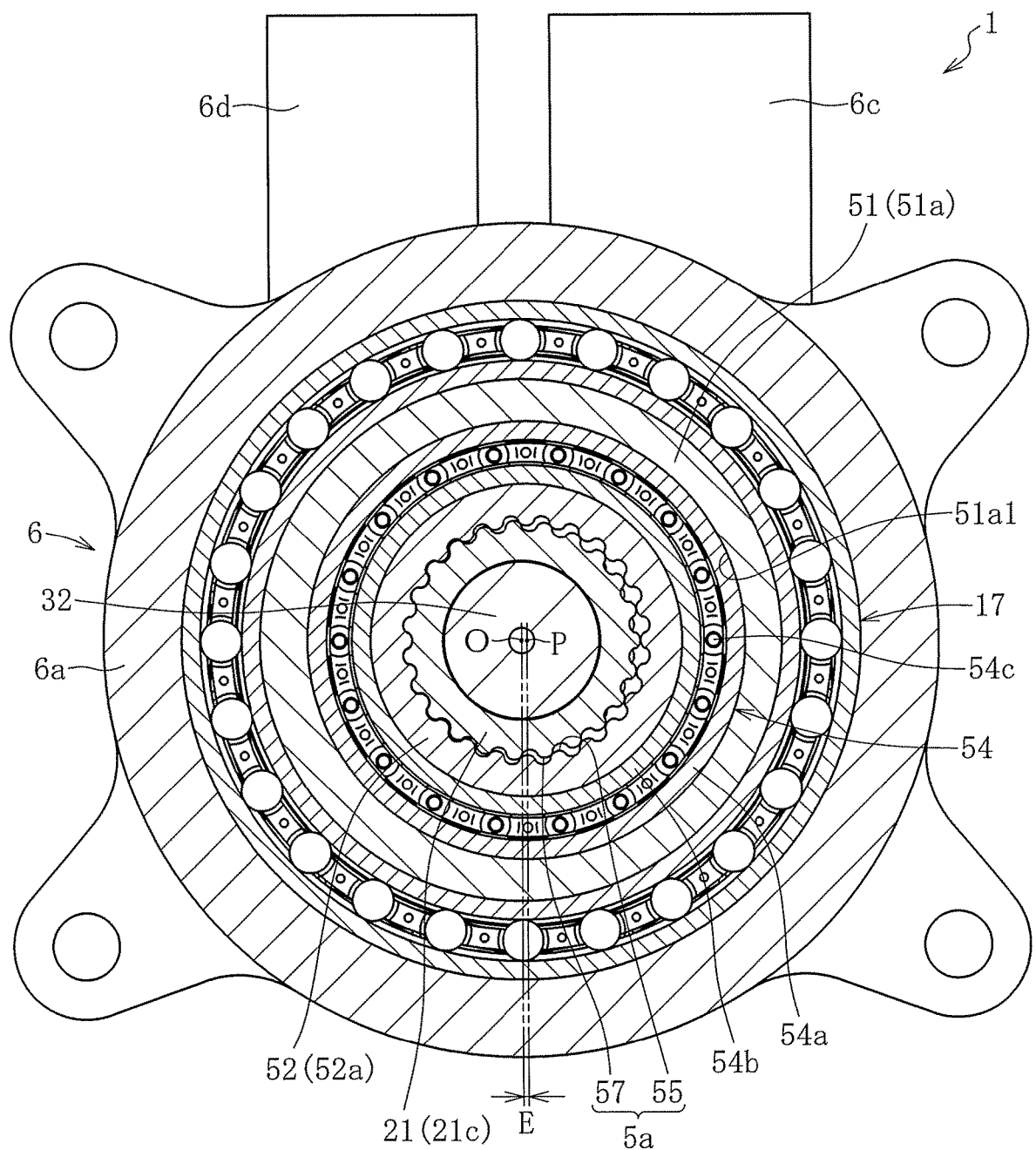
FIG. 18 is a cross-sectional view taken along line A-A in FIG. 14.
Figure 19:
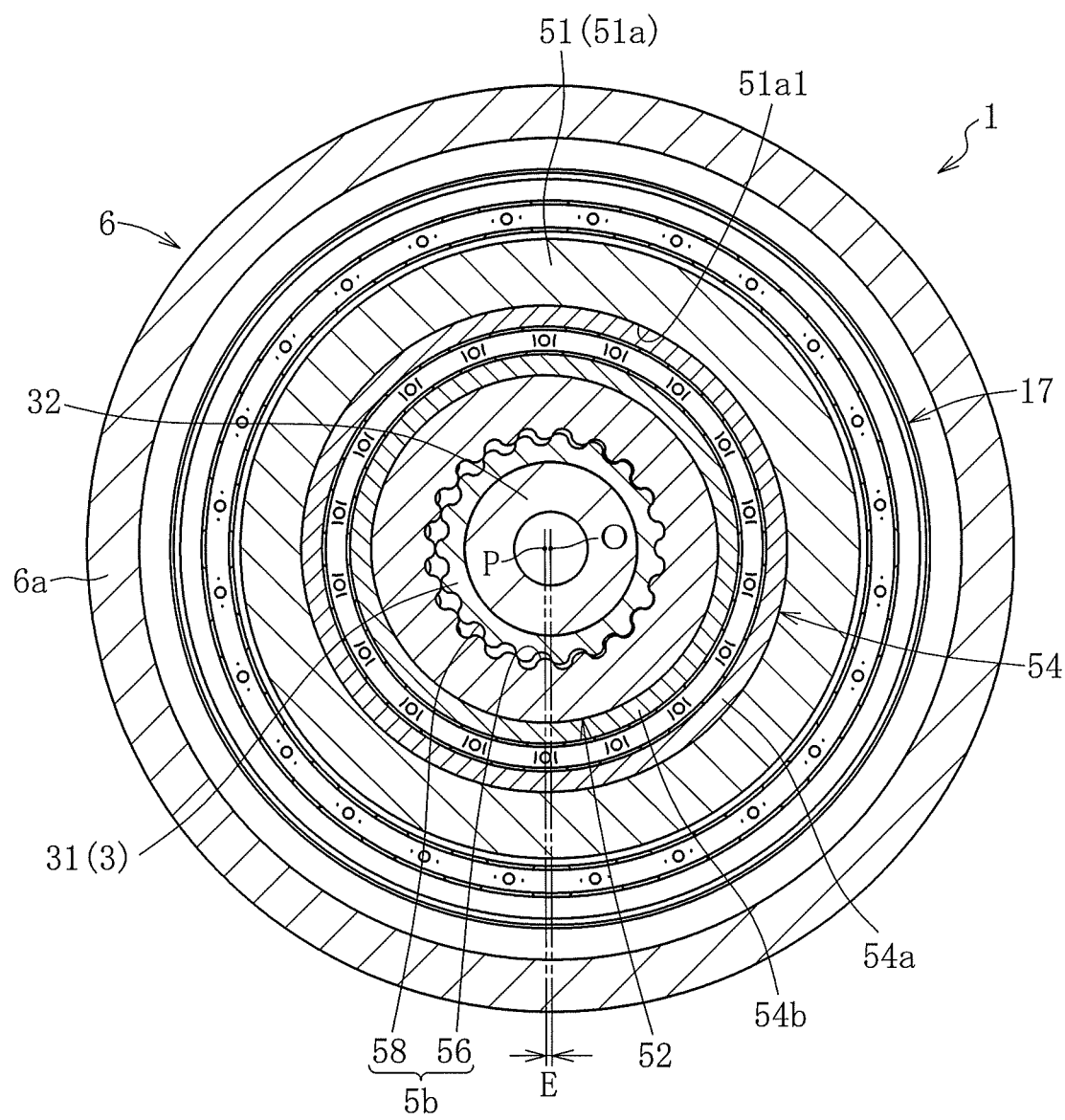
FIG. 19 is a cross-sectional view taken along line B-B in FIG. 14.

FIG. 18 is a cross-sectional view taken across the first speed reducer 5a (a cross-sectional view taken along line A-A in FIG. 14), and FIG. 19 is a cross-sectional view taken across the second speed reducer 5b (a cross-sectional view taken along line B-B in FIG. 14).

As shown in FIG. 18, the center P of the first inner teeth portion 55 is eccentric by a distance E in the radial direction with respect to the rotation axis O. Therefore, the first inner teeth portion 55 and the first outer teeth portion 57 mesh with each other in a partial region in the circumferential direction, and do not mesh with each other in a region on the side opposite to this partial region in the radial direction. Further, as shown in FIG. 19, since the center P of the second inner teeth portion 56 is also eccentric by a distance E in the radial direction with respect to the rotation axis O, the second inner teeth portion 56 and the second outer teeth portion 58 mesh with each other in a partial region in the circumferential direction, and do not mesh with each other in a region on the side opposite to this partial region in the radial direction. Because the view directions are different between FIGS. 18 and 19, the drawings show that the first inner teeth portion 55 and the second inner teeth portion 56 are eccentric to each other in laterally opposite directions, but the first inner teeth portion 55 and the second inner teeth portion 56 are eccentric in the same direction by the same distance E.

Here, when a reduction ratio of the differential 5 is i, a motor rotation speed is nm, and a rotation speed of the sprocket 22 is ns, an output rotation phase angle difference is represented by the formula (nm−ns)/i.

When the reduction ratio of the first speed reducer 5a is i1 and the reduction ratio of the second speed reducer 5b is i2, the reduction ratio of the differential 5 is obtained by the following Equation 1.

$$\text{Reduction ratio} = i1 \times i2 / |i1 - i2| \qquad \text{Equation 1}$$

For example, when the reduction ratio i1 of the first speed reducer 5a is 24/23 and the reduction ratio i2 of the second speed reducer 5b is 20/19, the reduction ratio is 120 according to the above Equation 1. As described above, with the differential 5, it is possible to obtain a high torque with a large reduction ratio.

In the electric actuator 1, since the drive rotating body 2 and the driven rotating body 3 are disposed on the inner diameter side of the planetary rotating body 52, a layout is adopted in which a hollow motor is adopted as the electric motor 4 that drives the planetary rotating body 52, and the hollow motor can be disposed on the outer diameter side of the planetary rotating body 52. As a result, space efficiency is improved, and there is an advantage that the electric actuator 1 can be made compact (in particular, the axial dimension can be made compact).

Next, an operation of the electric actuator will be described with reference to FIGS. 14 to 19.

During the operation of the engine, the drive rotating body 2 rotates by the driving force transmitted from the engine to the sprocket 22.

In a state where the electric motor 4 is not energized and there is therefor no input from the electric motor 4 to the differential 5, the rotation of the drive rotating body 2 is transmitted to the driven rotating body 3 via the planetary rotating body 52, and the driven rotating body 3 rotates integrally with the drive rotating body 2. That is, the drive rotating body 2 and the planetary rotating body 52 integrally rotate while maintaining a meshing state, by the torque transmitted at the meshing part between the first inner teeth portion 55 and the first outer teeth portion 57. Similarly, the planetary rotating body 52 and the driven rotating body 3 also integrally rotate while maintaining a meshing position between the second inner teeth portion 56 and the second outer teeth portion 58. Therefore, the drive rotating body 2 and the driven rotating body 3 rotate while maintaining the same rotation phase.

Thereafter, for example, when the engine shifts to a low rotation range such as an idle operation, the electric motor 4 is energized by a known means such as electronic control so as to rotate the rotor 42 relatively slower or faster than the rotation speed of the sprocket 22. When the electric motor 4 is operated, the eccentric member 51 coupled to the rotor core 42a of the rotor 42 rotates integrally about the rotation axis O. Accordingly, a pressing force caused by the rotation of the eccentric member 51 having the thin part and the thick part acts on the planetary rotating body 52 via the first bearing 53. This pressing force generates a component force in the circumferential direction at the meshing part between the first inner teeth portion 55 and the first outer teeth portion 57, so that the planetary rotating body 52 relatively performs eccentric rotational movement with respect to the drive rotating body 2. That is, the planetary rotating body 52 revolves about the rotation axis O and rotates about the center P of the first inner teeth portion 55 and the second inner teeth portion 56. At this time, the meshing position between the first inner teeth portion 55 and the first outer teeth portion 57 is shifted in the circumferential direction by one tooth every time the planetary rotating body 52 revolves once; therefore, the planetary rotating body 52 rotates (spins) while being decelerated.

When the planetary rotating body 52 performs the eccentric rotational movement described above, the meshing point between the second inner teeth portion 56 and the second outer teeth portion 58 is shifted in the circumferential direction by one tooth for each revolution of the planetary rotating body 52. As a result, the driven rotating body 3 rotates while being decelerated with respect to the planetary rotating body 52. As described above, when the planetary rotating body 52 is driven by the electric motor 4, the driving force from the electric motor 4 is superposed on the driving force from the sprocket 22, and the rotation of the driven rotating body 3 is in a differential state where the driven rotating body 3 is affected by the driving force from the electric motor 4. As a result, the relative rotation phase difference of the driven rotating body 3 with respect to the drive rotating body 2 can be changed in the forward and reverse directions, and the opening and closing timings of the valve by the camshaft 32 can be changed in the advance direction or the retard direction. Even when the opening and closing timings of the valve is changed in the advance direction or the retard direction as described above, the positional displacement prevention member 34 prevents the positional displacement of the main body 31 of the driven rotating body 3 and the camshaft 32 in the circumferential direction.

Since the opening and closing timings of the valve are changed as described above, it is possible to stabilize the rotation of the engine and improve the fuel efficiency during the idle operation. Further, when the operation of the engine shifts from the idle state to a normal operation and shifts, for example, to high speed rotation, the rotation phase difference of the camshaft 32 with respect to the sprocket 22 can be changed to the rotation phase difference suitable for the high speed rotation by increasing the speed difference of the relative rotation of the electric motor 4 with respect to the sprocket 22, so that the output of the engine can be increased.

Figure 20:
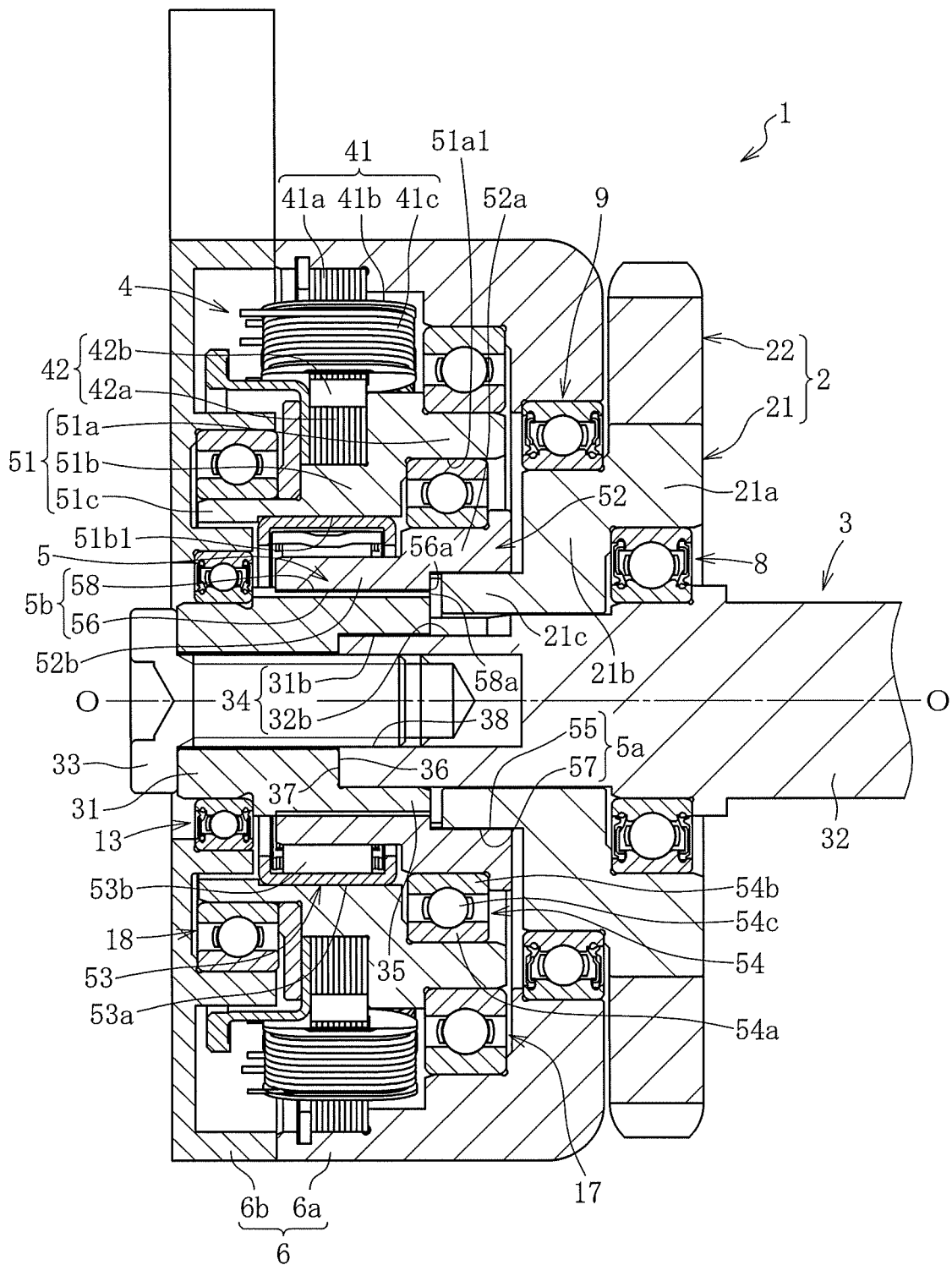
FIG. 20 is a cross-sectional view of an electric actuator.
Figure 21:
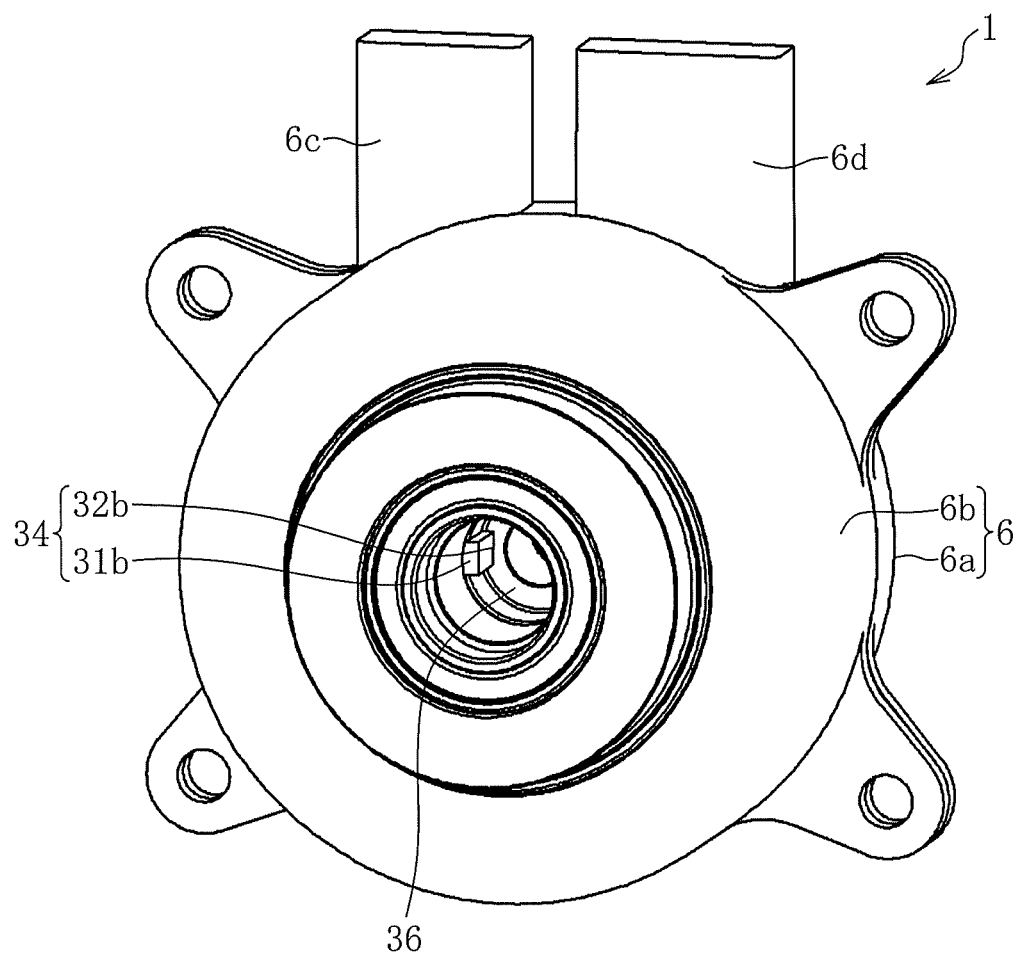
FIG. 21 is a perspective view of an electric actuator.
Figure 22:
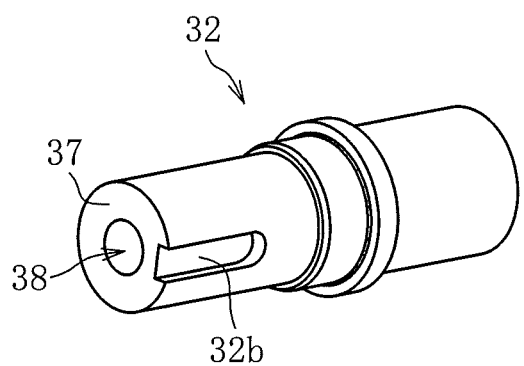
FIG. 22 is a perspective view of a camshaft.

FIGS. 20 to 22 illustrate another example of the electric actuator. FIG. 20 is a vertical cross-sectional view of an electric actuator, FIG. 21 is a perspective view of the electric actuator, and FIG. 22 is a perspective view of a camshaft.

In the electric actuator 1, the positional displacement prevention member 34 provided on the driven rotating body 3 and the camshaft 32 includes a key 31b formed in the main body 31 and a key groove 32b formed in the outer peripheral surface of the camshaft 32.

The key 31b is a protrusion protruding radially inward from an inner peripheral surface of the shaft housing portion 35 of the main body 31. The key groove 32b is formed in an area from one end (end face 37) of the camshaft 32 to a middle part of the outer peripheral surface of the camshaft 32.

When the main body 31 and the camshaft 32 are coupled to each other with the center bolt 33, the key 31b and the key groove 32b of the positional displacement prevention member 34 are fitted to each other, whereby the positional displacement between the main body 31 and the camshaft 32 in the circumferential direction is prevented. Note that, in FIG. 21, in order to illustrate how the key 31b and the key groove 32b are fitted to each other, the main body 31 is not entirely illustrated, and only a part of the key 31b is illustrated.

Figure 23:
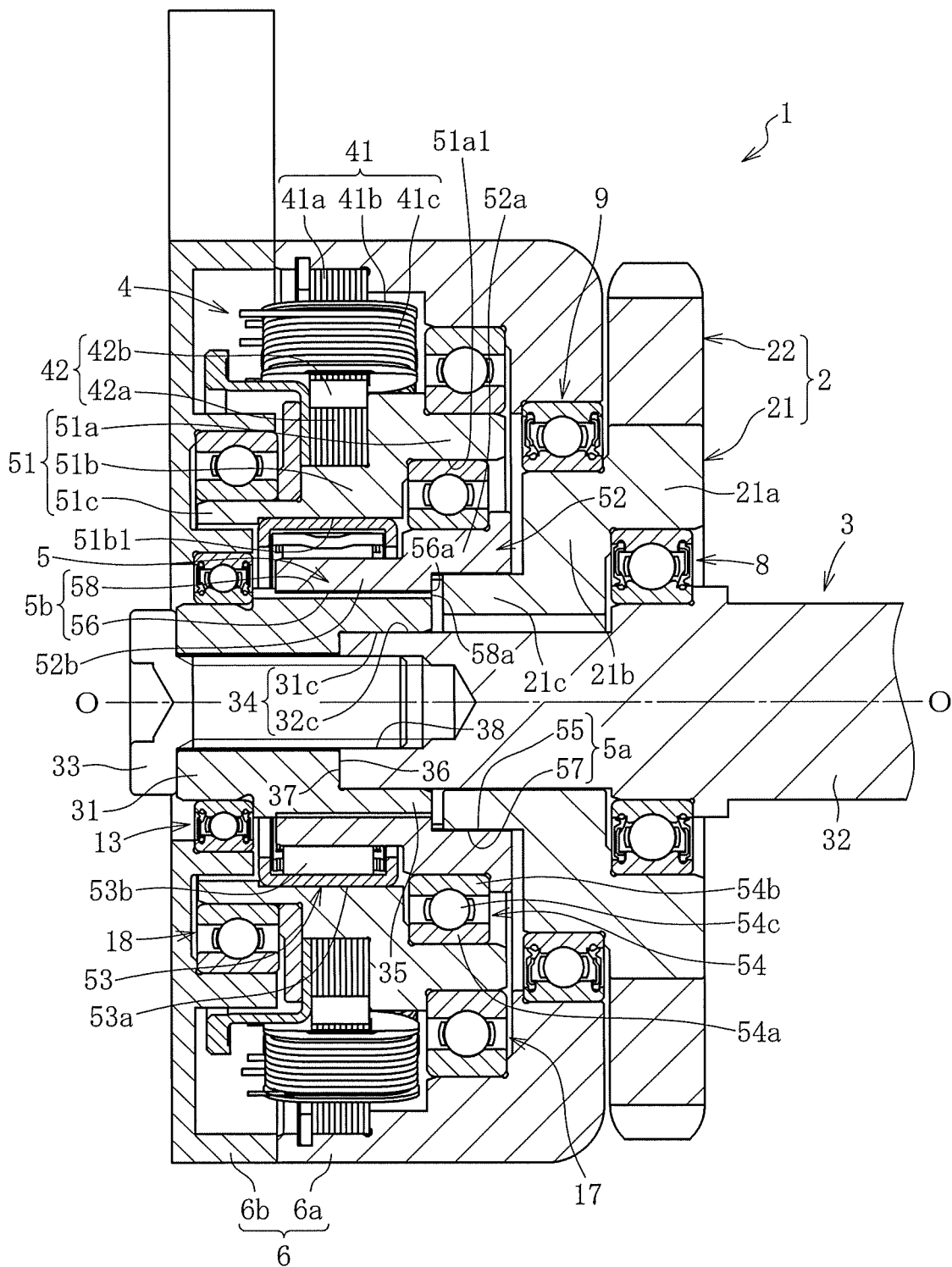
FIG. 23 is a cross-sectional view of an electric actuator.
Figure 24:
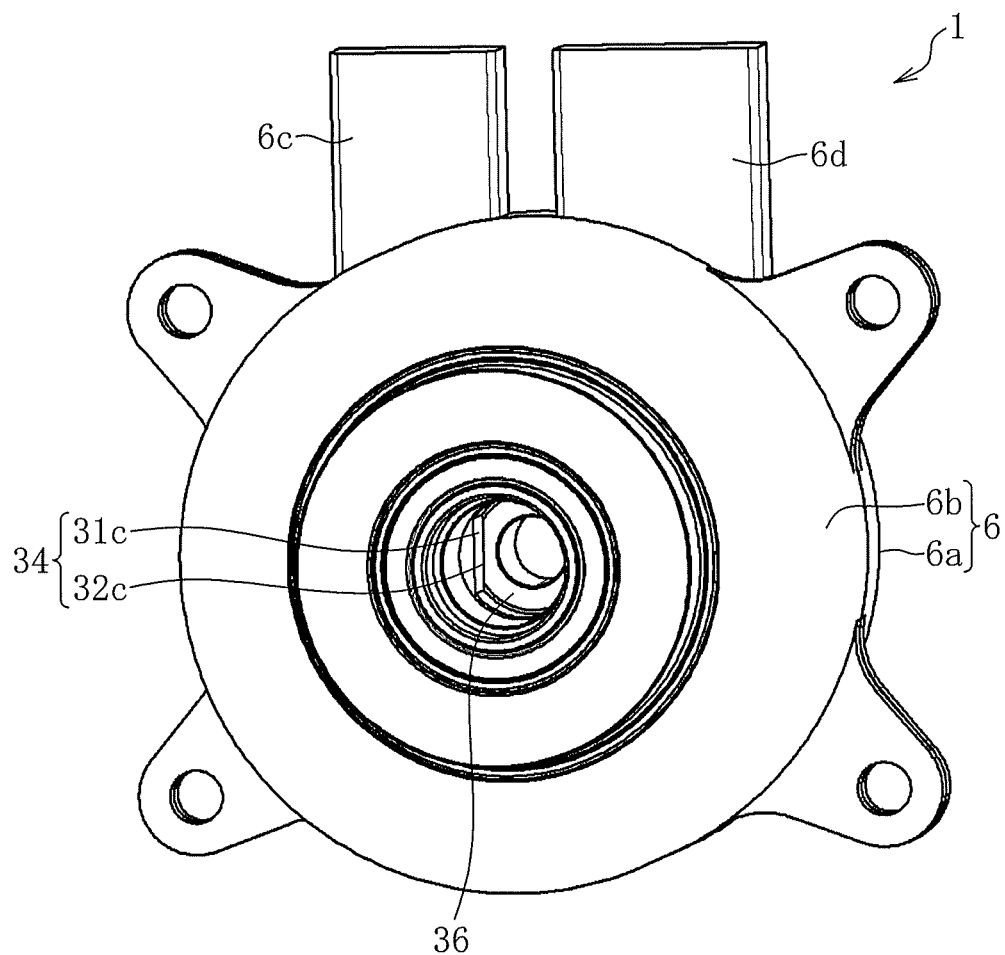
FIG. 24 is a perspective view of an electric actuator.
Figure 25:
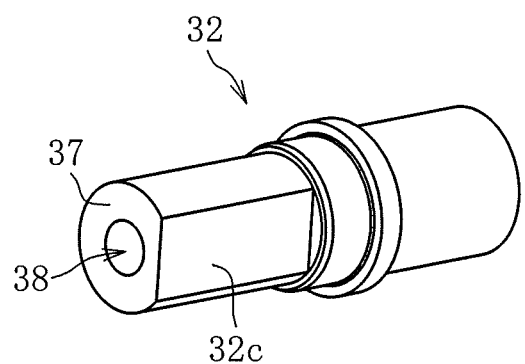
FIG. 25 is a perspective view of a camshaft.

FIGS. 23 to 25 illustrate another example of the electric actuator. FIG. 23 is a vertical cross-sectional view of an electric actuator, FIG. 24 is a perspective view of the electric actuator, and FIG. 25 is a perspective view of a camshaft.

In the electric actuator 1, the positional displacement prevention member 34 includes: a first flat plane 31c formed on the inner peripheral surface of the shaft housing portion 35 of the main body 31; and a second flat plane 32c formed on the outer peripheral surface of the camshaft 32. The first flat plane 31c and the second flat plane 32c are each configured in a so-called D-cut shape.

When the main body 31 and the camshaft 32 are coupled to each other with the center bolt 33, the first flat plane 31c and the second flat plane 32c of the positional displacement prevention member 34 are in contact with each other, whereby the positional displacement between the main body 31 and the camshaft 32 in the circumferential direction is prevented. Note that, in FIG. 24, in order to illustrate how the first flat plane 31c and the second flat plane 32c are in contact with each other, the main body 31 is not entirely illustrated, and only a part of the first flat surface 31c is illustrated.

In FIG. 14, the positional displacement prevention member 34 having one coupling pin 39 is illustrated as an example, but the electric actuator is not limited to this configuration. The positional displacement prevention member 34 can include a plurality of coupling pins 39, a plurality of first holes 31a and second holes 32a.

In FIG. 20, the positional displacement prevention member 34 configured with the key 31b formed in the main body 31 and with the key groove 32b formed in the camshaft 32 is illustrated as an example, but the electric actuator is not limited to this configuration. For example, the positional displacement prevention member 34 can be configured by a key groove formed in the main body 31 and a key formed in the camshaft 32. Further, the number of the number of key 31b and the number of key groove 32b each do not have to be one and may be more than one. The positional displacement prevention member 34 may be configured by serration fitting.

Each positional displacement prevention member 34 described above can also be applied to the electric actuator shown in FIGS. 1 to 5. That is, as the driven rotating body 3 of the electric actuator 1 shown in FIGS. 1 to 5, it is possible to use a rotating body including: a main body; a shaft coupled to the main body; and a positional displacement prevention member that prevents relative positional displacement between the main body and the shaft in the circumferential direction.

Although the embodiment of the electric actuator according to the present invention has been described above, the present invention is not limited to the above embodiment at all, and it is a matter of course that the electric actuator can be implemented in various forms without departing from the gist of the present invention.

REFERENCE SIGNS LIST

1 Electric actuator
2 Drive rotating body
3 Driven rotating body
4 Electric motor
5 Differential
5a First speed reducer
5b Second speed reducer
6 Casing (stationary member)
10 Cylinder head
22 Exhaust camshaft (second output member)
23 Sprocket (driving force input member)
32 Intake camshaft (first output member)
52 Planetary rotating body
55 First inner teeth portion
56 Second inner teeth portion
57 First outer teeth portion
58 Second outer teeth portion
O Rotation axis

The invention claimed is:

1. An electric actuator comprising:
a differential, the differential including: a drive rotating body rotatable about a rotation axis; a planetary rotating body that is rotatable and is revolvable about the rotation axis; and a driven rotating body rotatable about the rotation axis, wherein the planetary rotating body is engaged with each of the drive rotating body and the driven rotating body, a first speed reducer is constituted between the planetary rotating body and the drive rotating body, a second speed reducer is constituted between the planetary rotating body and the driven rotating body, and a reduction ratio of the first speed reducer and a reduction ratio of the second speed reducer are different from each other; and an electric motor that drives the planetary rotating body, wherein the drive rotating body is driven by a driving force from outside, the driven rotating body is provided with a first output member, the drive rotating body is provided with a second output member, and in a state where the electric motor is not energized, rotation of the drive rotating body is transmitted to the driven rotating body via the planetary rotating body, and the driven rotating body rotates integrally with the drive rotating body while maintaining a same rotation phase with the drive rotating body.

2. The electric actuator according to claim 1, wherein one of the first output member and the second output member is an intake camshaft, and another of the first output member and the second output member is an exhaust camshaft.

3. The electric actuator according to claim 2, wherein one of the intake camshaft and the exhaust camshaft has a hollow shape, and another of the intake camshaft and the exhaust camshaft is disposed on an inner periphery of the one of the intake camshaft and the exhaust camshaft.

4. The electric actuator according to claim 3 that is used in SOHC type engine.

5. The electric actuator according to claim 3, wherein the electric motor includes:
  a casing;
  a stator fixed to an inner periphery of the casing; and
  a rotor rotatable with respect to the casing about the rotation axis, the casing includes:
  a first casing member; and
  a second casing member, an outer peripheral surface of the second casing member and an outer peripheral surface of the stator are fit to an inner peripheral surface of the first casing member, and the first casing member and the second casing member sandwich and fix the stator from both axial sides.

6. The electric actuator according to claim 2 that is used in SOHC type engine.

7. The electric actuator according to claim 2, wherein the electric motor includes:
  a casing;
  a stator fixed to an inner periphery of the casing; and
  a rotor rotatable with respect to the casing about the rotation axis, the casing includes:
  a first casing member; and
  a second casing member, an outer peripheral surface of the second casing member and an outer peripheral surface of the stator are fit to an inner peripheral surface of the first casing member, and the first casing member and the second casing member sandwich and fix the stator from both axial sides.

8. The electric actuator according to claim 1, wherein the first output member is an intake camshaft, the second output member is an exhaust camshaft, the exhaust camshaft has a hollow shape, and an intake camshaft is disposed on an inner periphery of the exhaust camshaft.

9. The electric actuator according to claim 8 that is used in SOHC type engine.

10. The electric actuator according to claim 1 that is used in SOHC type engine.

11. The electric actuator according to claim 1, wherein the electric motor includes:
  a casing;
  a stator fixed to an inner periphery of the casing; and
  a rotor rotatable with respect to the casing about the rotation axis, the casing includes:
  a first casing member; and
  a second casing member, an outer peripheral surface of the second casing member and an outer peripheral surface of the stator are fit to an inner peripheral surface of the first casing member, and the first casing member and the second casing member sandwich and fix the stator from both axial sides.

12. The electric actuator according to claim 11, further comprising:

a motor shaft that rotates integrally with the rotor;

a first bearing that rotatably supports a first axial end part of the motor shaft with respect to the first casing member; and a second bearing that rotatably supports a second axial end part of the motor shaft with respect to the second casing member.

13. The electric actuator according to claim 1, wherein the driven rotating body includes:
  a main body;
  a shaft connected to the main body; and
  a positional displacement prevention member that prevents relative positional displacement between the main body and the shaft in a circumferential direction.

14. The electric actuator according to claim 13, wherein the positional displacement prevention member includes:
  a first hole formed in the main body;
  a second hole formed in an end face of the shaft; and
  a coupling pin inserted in the first hole and the second hole.

15. The electric actuator according to claim 13, wherein the positional displacement prevention member includes:
  a key groove formed in one of the main body and the shaft; and
  a key formed in another of the main body and the shaft.

16. The electric actuator according to claim 13, wherein the main body is configured in a tubular shape that allows the shaft to be inserted in an inside of the main body, and the positional displacement prevention member includes:
  a first plane formed on an inner peripheral surface of the main body; and
  a second plane that is formed on an outer peripheral surface of the shaft and is in contact with the first plane.

17. The electric actuator according to claim 13, wherein the electric motor includes an annular rotor, and the positional displacement prevention member is disposed inside the annular rotor.

18. The electric actuator according to claim 13, further comprising:

a sprocket provided on the drive rotating body; and a cam provided on the shaft, wherein the electric actuator is used in a variable valve timing device that changes opening and closing timings of a valve by changing a rotation phase difference of the shaft with respect to the sprocket.

\* \* \* \* \*